(12) United States Patent
Fujishiro et al.

(10) Patent No.: US 9,820,287 B2
(45) Date of Patent: Nov. 14, 2017

(54) MOBILE COMMUNICATIONS DIRECTED TO ASSIGNMENT OF RADIO RESOURCES AND REPORTING PATHLOSS OF D2D COMMUNICATIONS

(71) Applicant: KYOCERA CORPORATION, Kyoto (JP)

(72) Inventors: Masato Fujishiro, Yokohama (JP); Hiroyuki Adachi, Kawasaki (JP); Fangwei Tong, Machida (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/766,945

(22) PCT Filed: Feb. 7, 2014

(86) PCT No.: PCT/JP2014/052964
§ 371 (c)(1),
(2) Date: Aug. 10, 2015

(87) PCT Pub. No.: WO2014/126022
PCT Pub. Date: Aug. 21, 2014

(65) Prior Publication Data
US 2015/0373730 A1 Dec. 24, 2015

Related U.S. Application Data

(60) Provisional application No. 61/763,587, filed on Feb. 12, 2013.

(51) Int. Cl.
*H04W 72/00* (2009.01)
*H04W 72/08* (2009.01)
(Continued)

(52) U.S. Cl.
CPC ......... *H04W 72/082* (2013.01); *H04L 1/0003* (2013.01); *H04L 1/0025* (2013.01);
(Continued)

(58) Field of Classification Search
None
See application file for complete search history.

(56) References Cited

U.S. PATENT DOCUMENTS

2009/0011770 A1 1/2009 Jung et al.
2010/0093364 A1* 4/2010 Ribeiro ............... H04W 72/082
455/452.2
(Continued)

FOREIGN PATENT DOCUMENTS

JP 2009-017560 A 1/2009
WO 2011/143496 A1 11/2011
(Continued)

OTHER PUBLICATIONS

Communication pursuant to Rule 164(1) EPC issued by the European Patent Office dated Sep. 20, 2016, which corresponds to European Patent Application No. 14751084.6-1857 and is related to U.S. Appl. No. 14/766,945.
(Continued)

*Primary Examiner* — Idowu O Osifade
(74) *Attorney, Agent, or Firm* — Studebaker & Brackett PC

(57) ABSTRACT

A mobile communication system supports cellular communication in which a data path passes through a core network and D2D communication that is direct device-to-device communication in which the data path does not pass through the core network. The system comprises a communication apparatus that assigns a radio resource to a D2D terminal that performs the D2D communication, wherein the communication apparatus performs assignment determination as
(Continued)

to whether a dedicated radio resource not shared with the cellular communication is assigned to the D2D terminal or a shared radio resource shared with the cellular communication is assigned to the D2D terminal.

7 Claims, 18 Drawing Sheets

(51) Int. Cl.

| | |
|---|---|
| H04W 28/06 | (2009.01) |
| H04W 72/04 | (2009.01) |
| H04L 1/00 | (2006.01) |
| H04W 52/38 | (2009.01) |
| H04W 8/00 | (2009.01) |
| H04W 24/08 | (2009.01) |
| H04W 92/18 | (2009.01) |
| H04W 88/02 | (2009.01) |
| H04W 88/08 | (2009.01) |

(52) U.S. Cl.
CPC ........... *H04W 8/005* (2013.01); *H04W 24/08* (2013.01); *H04W 28/06* (2013.01); *H04W 52/383* (2013.01); *H04W 72/04* (2013.01); *H04L 1/0009* (2013.01); *H04W 72/0486* (2013.01); *H04W 72/087* (2013.01); *H04W 88/02* (2013.01); *H04W 88/08* (2013.01); *H04W 92/18* (2013.01)

(56) References Cited

U.S. PATENT DOCUMENTS

| | | |
|---|---|---|
| 2012/0129562 A1 | 5/2012 | Stamoulis et al. |
| 2012/0243431 A1 | 9/2012 | Chen et al. |
| 2013/0176979 A1 | 7/2013 | Ohwatari et al. |
| 2014/0153390 A1* | 6/2014 | Ishii .................... H04W 76/023 370/230 |

FOREIGN PATENT DOCUMENTS

| | | |
|---|---|---|
| WO | 2012/034269 A1 | 3/2012 |
| WO | 2012/035991 A1 | 3/2012 |

OTHER PUBLICATIONS

Klaus Doppler et al.; "Mode Selection for Device-to-Device Communication underlaying an LTE-Advanced Network"; Wireless Communications and Networking Conference (WCNC); 2010; pp. 1-6; IEEE; USA.

International Search Report for application No. PCT/JP2014/052964 dated Mar. 18, 2014.

3rd Generation Partnership Project; Technical Specification Group SA; Feasibility Study for Proximity Services (ProSe) (Release 12), 3GPP TR 22.803 v1.0.0 (Aug. 2012).

* cited by examiner

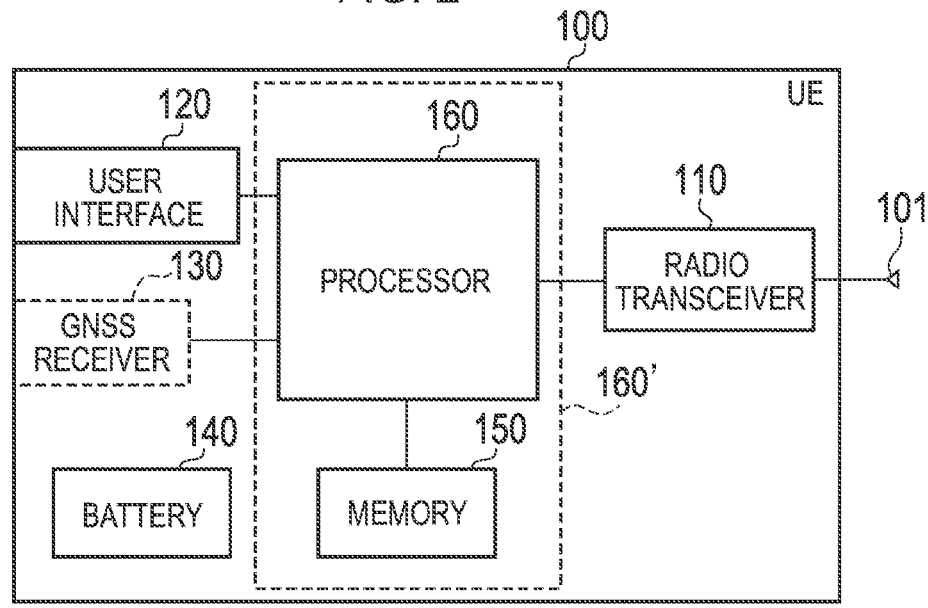
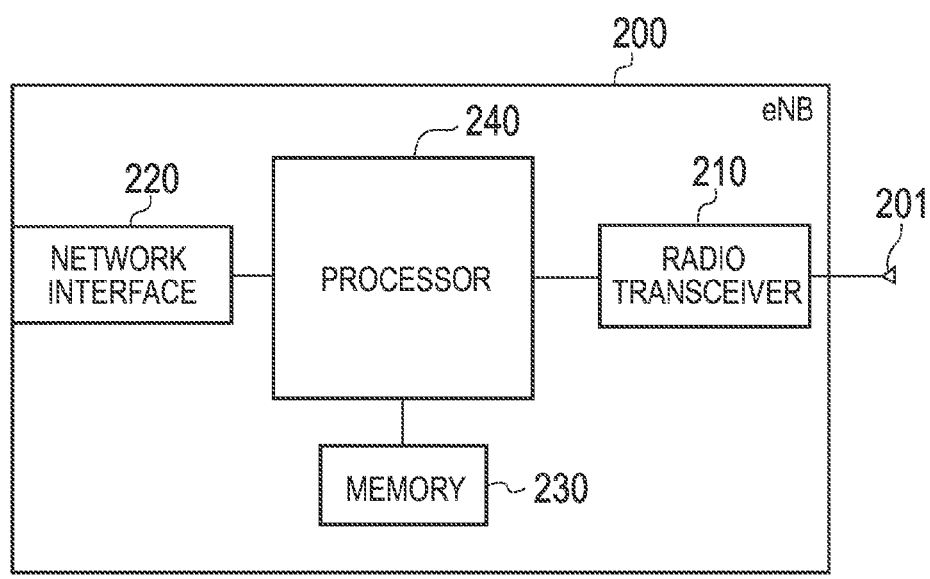

FIG. 23
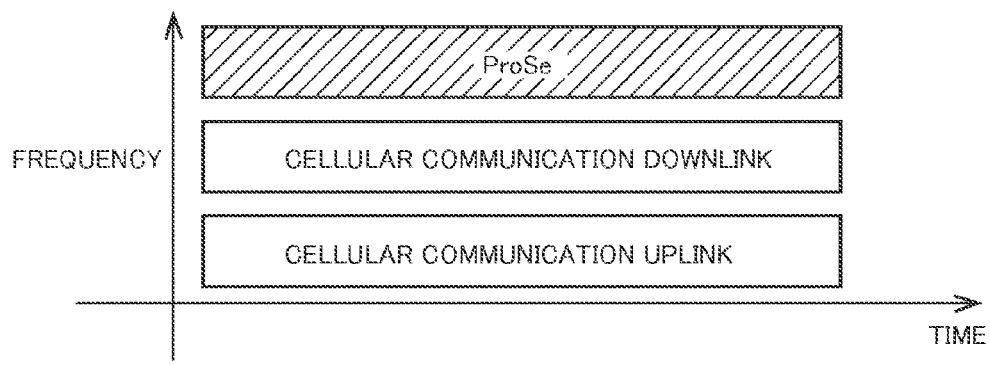
FIG. 24
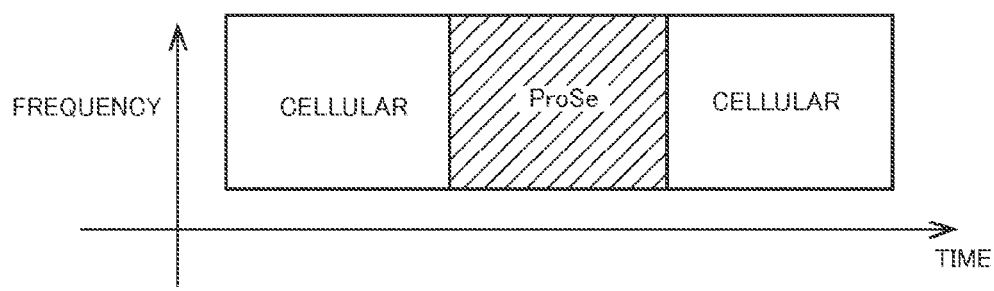
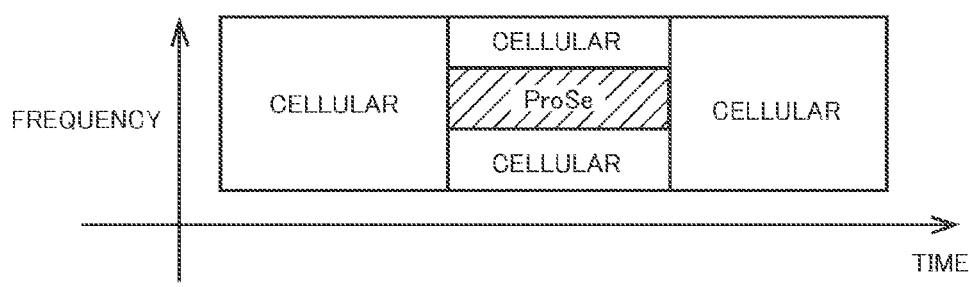

FIG. 25
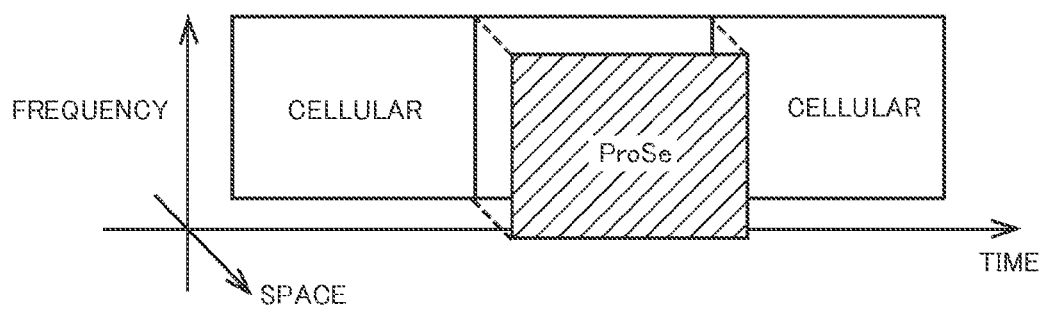
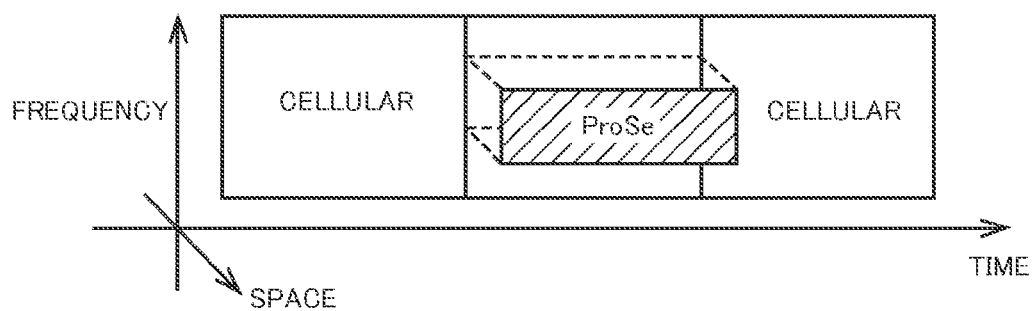
FIG. 26
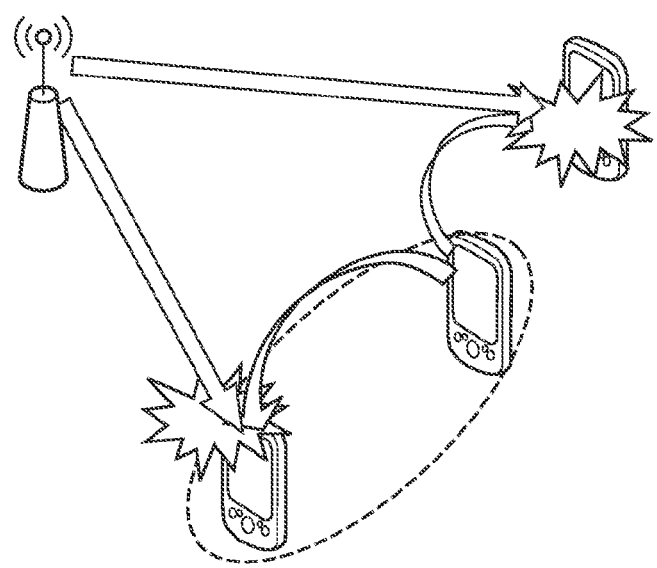

MOBILE COMMUNICATIONS DIRECTED TO ASSIGNMENT OF RADIO RESOURCES AND REPORTING PATHLOSS OF D2D COMMUNICATIONS

TECHNICAL FIELD

The present invention relates to a mobile communication system, a communication apparatus, and a D2D terminal that support D2D communication.

RELATED ART

In 3GPP (3rd Generation Partnership Project) which is a project aiming to standardize a mobile communication system, the introduction of Device to Device (D2D) communication is discussed as a new function on and after Release 12 (see Non-patent art document 1). The D2D communication may be called as Proximity Service (ProSe).

In D2D communication, a plurality of adjacent user terminals perform direct communication without passing through a core network. That is, a data path of the D2D communication does not pass through the core network. On the other hand, a data path of normal communication (cellular communication) of the mobile communication system goes through the core network.

PRIOR ART DOCUMENT

Non-Patent Document

Non-patent document 1: 3GPP technical report "TR 22.803 V1.0.0" November 2012

SUMMARY OF THE INVENTION

Now, in order to prevent interference between the cellular communication and the D2D communication in a mobile communication system, a dedicated radio resource not shared with the cellular communication may be assigned to a user terminal that performs the D2D communication (a D2D terminal).

However, in such a method, a radio resource capable of being assigned to a user terminal that performs the cellular communication (a cellular terminal) is relatively decreased in quantity, and therefore, it is difficult to improve usage efficiency of the radio resource in the mobile communication system.

Therefore, the present invention provides a mobile communication system capable of improving the use efficiency of the radio resource while suppressing an influence of the interference.

A mobile communication system according to a first aspect supports cellular communication in which a data path passes through a core network and D2D communication that is direct device-to-device communication in which the data path does not pass through the core network. The system comprises: a communication apparatus configured to assign a radio resource to a D2D terminal that performs the D2D communication. The communication apparatus performs assignment determination as to whether a dedicated radio resource not shared with the cellular communication is assigned to the D2D terminal or a shared radio resource shared with the cellular communication is assigned to the D2D terminal.

A mobile communication system according to a second aspect supports cellular communication in which a data path passes through a core network and D2D communication that is direct device-to-device communication in which the data path does not pass through the core network. The system comprises: a base station; a cellular terminal that performs the cellular communication in a cell of the base station; and a D2D terminal that performs the D2D communication in the cell by using a shared radio resource shared with the cellular communication. At least one communication apparatus among the base station, the cellular terminal, and the D2D terminal performs null steering so as to suppress an influence of interference between the cellular communication and the D2D communication.

A mobile communication system according to a third aspect supports cellular communication in which a data path passes through a core network and D2D communication that is direct device-to-device communication in which the data path does not pass through the core network. The system comprises: a communication apparatus; a cellular terminal configured to perform the cellular communication; and a D2D terminal configured to perform the D2D communication by using a shared radio resource shared with the cellular communication. The D2D terminal notifies the communication apparatus of information on a D2D communication pathloss that is a pathloss between the D2D terminal and another D2D terminal that is a communication partner of the D2D terminal. The base station controls transmission power of at least one communication apparatus among the cellular terminal, the base station, and the D2D terminal, on the basis of the D2D communication pathloss.

BRIEF DESCRIPTION OF THE DRAWINGS

FIG. 2 is a block diagram of UE according to the first embodiment to the third embodiment.

FIG. 3 is a block diagram of eNB according to the first embodiment to the third embodiment.

FIG. 23 is a diagram illustrating a method of preparing a band being used exclusively for ProSe.

FIG. 24 is a diagram illustrating a method of preparing a region for ProSe by time-dividing, frequency-dividing, or both of them on the cellular communication band.

FIG. 25 is a diagram illustrating, with respect to a resource on the cellular communication band, the method of sharing the resource by spatially multiplexing a resource for the ProSe.

FIG. 26 is a diagram illustrating a case of arranging a ProSe band on a downlink band of the cellular communication.

DESCRIPTION OF THE EMBODIMENTS

Overview of Embodiment

Figure 1:
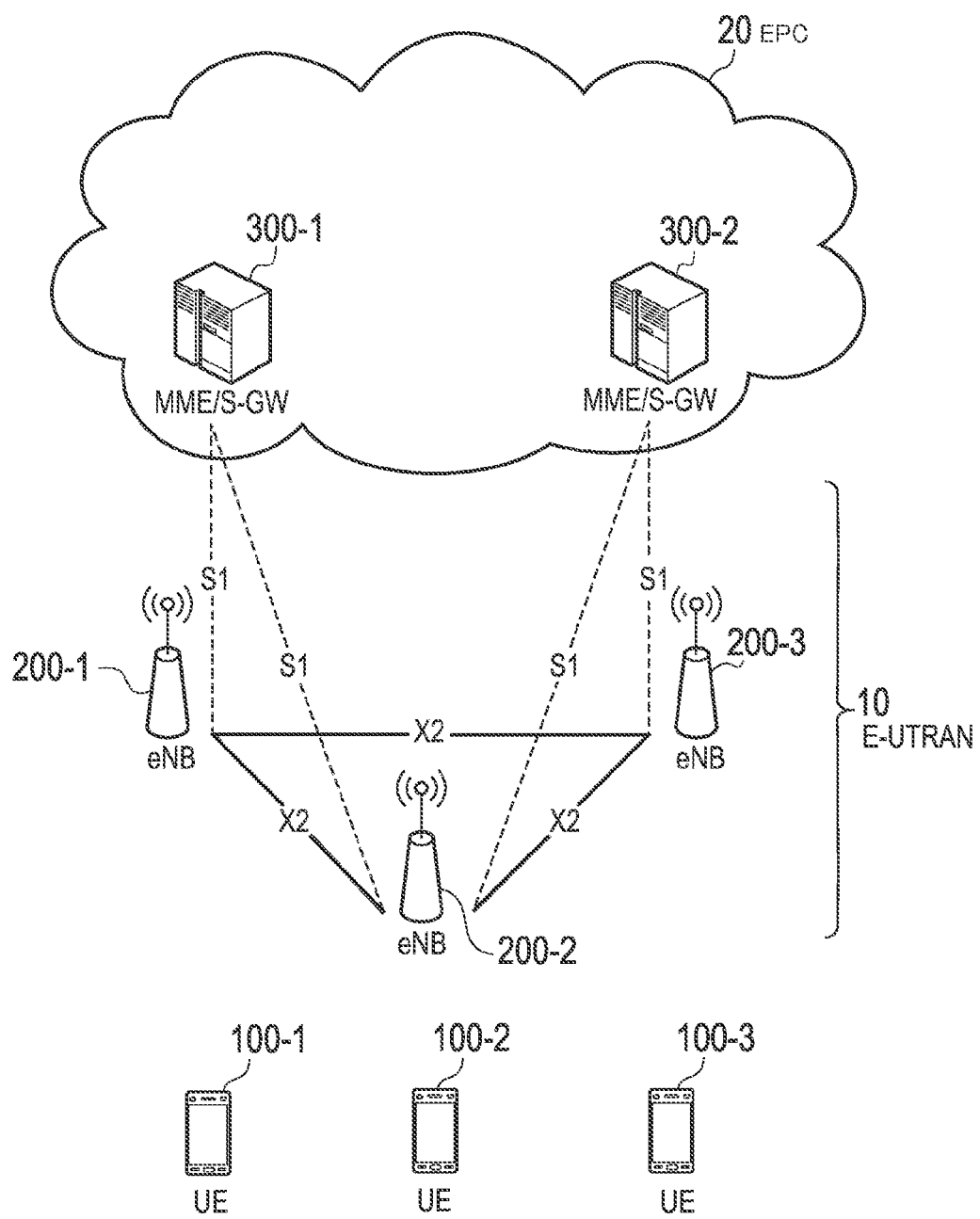
FIG. 1 is a configuration diagram of an LTE system according to a first embodiment to a third embodiment.

A mobile communication system according to a first embodiment supports cellular communication in which a data path passes through a core network and D2D communication that is direct device-to-device communication in which the data path does not pass through the core network. The system comprises: a communication apparatus that assigns a radio resource to a D2D terminal that performs the D2D communication. The communication apparatus performs assignment determination as to whether a dedicated radio resource not shared with the cellular communication is assigned to the D2D terminal or a shared radio resource shared with the cellular communication is assigned to the D2D terminal.

In the first embodiment, the communication apparatus performs the assignment determination on the basis of an amount of radio resource to be used in a cell in which the D2D terminal exists.

In the first embodiment, the communication apparatus performs the assignment determination on the basis of a communication quality of the D2D communication.

The communication quality includes a status of an interference suffered by the D2D terminal. The communication apparatus instructs the D2D terminal to perform an interference detection. The D2D terminal reports an interference detection result to the communication apparatus on the basis of an instruction of the interference detection.

In the first embodiment, the communication apparatus performs the assignment determination on the basis of information on a pathloss between the D2D terminal and other device. The other device is any of: a cellular terminal that performs the cellular communication, a base station that assigns the radio resource to the D2D terminal, another D2D terminal that is not a communication partner of the D2D terminal, and the other D2D terminal that is a communication partner of the D2D terminal.

One of the D2D terminal, the cellular terminal, and the other D2D terminal reports the information on the pathloss to the communication apparatus. The communication apparatus receives the information on the pathloss, and performs the assignment determination on the basis of the received information.

A communication apparatus according to the first embodiment assigns a radio resource to a D2D terminal that performs D2D communication in a mobile communication system that supports cellular communication in which a data path passes through a core network and the D2D communication that is direct device-to-device communication in which the data path does not pass through the core network. The device comprises: a controller configured to perform assignment determination as to whether a dedicated radio resource not shared with the cellular communication is assigned to the D2D terminal or a shared radio resource shared with the cellular communication is assigned to the D2D terminal.

A processor according to the first embodiment is provided in a communication apparatus that assigns a radio resource to a D2D terminal that performs D2D communication in a mobile communication system that supports cellular communication in which a data path passes through a core network and the D2D communication that is direct device-to-device communication in which the data path does not pass through the core network. The processor performs assignment determination as to whether a dedicated radio resource not shared with the cellular communication is assigned to the D2D terminal or a shared radio resource shared with the cellular communication is assigned to the D2D terminal.

A communication control method according to the first embodiment is used in a mobile communication system that supports cellular communication in which a data path passes through a core network and D2D communication that is direct device-to-device communication in which the data path does not pass through the core network. The method comprises: a step of performing, in a communication apparatus that assigns a radio resource to a D2D terminal that performs the D2D communication, assignment determination as to whether a dedicated radio resource not shared with the cellular communication is assigned to the D2D terminal or a shared radio resource shared with the cellular communication is assigned to the D2D terminal.

A mobile communication system according to a second embodiment supports cellular communication in which a data path passes through a core network and D2D communication that is direct device-to-device communication in which the data path does not pass through the core network. The system comprises: a base station; a cellular terminal that performs the cellular communication in a cell of the base station; and a D2D terminal that performs the D2D communication in the cell by using a shared radio resource shared with the cellular communication. At least one communication apparatus among the base station, the cellular terminal, and the D2D terminal performs null steering so as to suppress an influence of interference between the cellular communication and the D2D communication.

In the second embodiment, the base station performs the null steering of directing a null to the D2D terminal, on the basis of a reference signal received by the base station from the D2D terminal.

In the second embodiment, the D2D terminal transmits, to the base station, precoder matrix information for the base station directing the null to the D2D terminal. The base station performs the null steering of directing the null to the D2D terminal, on the basis of the precoder matrix information.

In the second embodiment, the D2D terminal generates precoder matrix information for the cellular terminal directing the null to the D2D terminal. The cellular terminal performs the null steering of directing the null to the D2D terminal, on the basis of the precoder matrix information.

A communication apparatus according to the second embodiment is used in a mobile communication system that supports cellular communication in which a data path passes through a core network and D2D communication that is direct device-to-device communication in which the data path does not pass through the core network. The device comprises: a controller configured to perform null steering so as to suppress an influence of interference between the cellular communication and the D2D communication. The communication apparatus is a base station, a cellular terminal that performs the cellular communication, or a D2D terminal that performs the D2D communication. The D2D communication is performed by using a shared radio resource shared with the cellular communication.

A processor according to the second embodiment is provided in a communication apparatus used in a mobile communication system that supports cellular communication in which a data path passes through a core network and D2D communication that is direct device-to-device communication in which the data path does not pass through the core network. The processor executes a process of performing null steering so as to suppress an influence of interference between the cellular communication and the D2D communication. The communication apparatus is a base station, a cellular terminal that performs the cellular communication, or a D2D terminal that performs the D2D communication. The D2D communication is performed by using a shared radio resource shared with the cellular communication.

A communication control method according to the second embodiment is used in a mobile communication system that supports cellular communication in which a data path passes through a core network and D2D communication that is direct device-to-device communication in which the data path does not pass through the core network. The method comprises: a step of performing, by a cellular terminal, the cellular communication in a cell of a base station; a step of performing, by a D2D terminal, the D2D communication in the cell, by using a shared radio resource shared with the cellular communication; and a step of performing, by at least one communication apparatus among the base station, the cellular terminal, and the D2D terminal, null steering so as to suppress an influence of interference between the cellular communication and the D2D communication.

A mobile communication system according to a third embodiment supports cellular communication in which a data path passes through a core network and D2D communication that is direct device-to-device communication in which the data path does not pass through the core network. The system comprises: a communication apparatus; a cellular terminal that performs the cellular communication; and a D2D terminal that performs the D2D communication by using a shared radio resource shared with the cellular communication. The D2D terminal notifies the communication apparatus of information on a D2D communication pathloss that is a pathloss between the D2D terminal and another D2D terminal that is a communication partner of the D2D terminal. The communication apparatus controls transmission power of at least one communication apparatus among the cellular terminal, the communication apparatus, and the D2D terminal, on the basis of the D2D communication pathloss.

In the third embodiment, the shared radio resource is provided in an uplink radio resource of the cellular communication. The communication apparatus performs a transmission power control so as to increase the transmission power of the cellular terminal when the D2D communication pathloss is greater than a threshold value.

In the third embodiment, the shared radio resource is provided in an uplink radio resource of the cellular communication. The communication apparatus performs a transmission power control so as to increase the transmission power of the D2D terminal when the D2D communication pathloss is smaller than the threshold value.

In the third embodiment, the shared radio resource is provided in a downlink radio resource of the cellular communication. The communication apparatus performs a transmission power control so as to increase the transmission power of the D2D terminal when the D2D communication pathloss is smaller than the threshold value.

In the third embodiment, the shared radio resource is provided in a downlink radio resource of the cellular communication. The communication apparatus performs a transmission power control so as to increase the transmission power of the communication apparatus when the D2D communication pathloss is greater than the threshold value.

A D2D terminal according to the third embodiment is capable of performing D2D communication by using a shared radio resource shared with cellular communication in a mobile communication system that supports the cellular communication in which a data path passes through a core network and the D2D communication that is direct device-to-device communication in which the data path does not pass through the core network. The terminal comprises: a controller configured to notify a communication apparatus of information on a D2D communication pathloss that is a pathloss between the D2D terminal and another D2D terminal that is a communication partner of the D2D terminal.

A processor according to the third embodiment is provided in a D2D terminal capable of performing D2D communication by using a shared radio resource shared with cellular communication in a mobile communication system that supports the cellular communication in which a data path passes through a core network and the D2D communication that is direct device-to-device communication in which the data path does not pass through the core network. A communication apparatus is notified of information on a D2D communication pathloss that is a pathloss between the D2D terminal and another D2D terminal that is a communication partner of the D2D terminal.

A communication apparatus according to the third embodiment is used in a mobile communication system that supports cellular communication in which a data path passes through a core network and D2D communication that is direct device-to-device communication in which the data path does not pass through the core network. The communication apparatus comprises: a controller configured to control transmission power of at least one of a cellular terminal, the communication apparatus, and the D2D terminal, on the basis of information on a D2D communication pathloss that is a pathloss between the D2D terminal and another D2D terminal that is a communication partner of the D2D terminal.

A processor according to the third embodiment is provided in a communication apparatus used in a mobile communication system that supports cellular communication in which a data path passes through a core network and D2D communication that is direct device-to-device communication in which the data path does not pass through the core network. The processor controls transmission power of at least one of a cellular terminal, the communication apparatus, and the D2D terminal, on the basis of information on a D2D communication pathloss that is a pathloss between the D2D terminal and another D2D terminal that is a communication partner of the D2D terminal.

A communication control method according to the third embodiment is used in a mobile communication system that supports cellular communication in which a data path passes through a core network and D2D communication that is direct device-to-device communication in which the data path does not pass through the core network. The method comprises: a step of performing, by a cellular terminal, the cellular communication; a step of performing, by a D2D terminal, the D2D communication by using a shared radio resource shared with the cellular communication; a step of notifying, by the D2D terminal, the communication apparatus of information on a D2D communication pathloss that is a pathloss between the D2D terminal and another D2D terminal that is a communication partner of the D2D terminal; and a step of controlling, by the communication apparatus, transmission power of at least one of the cellular terminal, the communication apparatus, and the D2D terminal, on the basis of the information on the D2D communication pathloss.

First Embodiment

Hereinafter, with reference to the accompanying drawings, description will be provided for an embodiment in which D2D communication is introduced to a mobile communication system (an LTE system) configured to comply with the 3GPP standards.

(LTE System)

FIG. 1 is a configuration diagram of an LTE system according to the first embodiment. As shown in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 corresponds to a radio access network and the EPC 20 corresponds to a core network. The E-UTRAN 10 and the EPC 20 configure a network of the LTE system.

The UE 100 is a mobile communication apparatus and performs radio communication with a cell (a serving cell) with which a connection is established. The UE 100 corresponds to a user terminal.

The E-UTRAN 10 includes a plurality of eNBs 200 (evolved Node-Bs). The eNB 200 corresponds to a base station. The eNB 200 constitutes one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes a plurality of MME (Mobility Management Entity)/S-GWs (Serving-Gateways) 300. The MME is a network node for performing various mobility controls and the like for the UE 100 and corresponds to a controller. The S-GW is a network node that performs transfer control of user data and corresponds to a mobile switching center. The EPC 20 including the MME/S-GW 300 accommodates the eNB 200.

The eNBs 200 are connected mutually via an X2 interface. Further, the eNB 200 is connected to the MME/S-GW 300 via an S1 interface.

Next, the configurations of the UE 100 and the eNB 200 will be described.

FIG. 2 is a block diagram of the UE 100. As shown in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a controller. The UE 100 may not have the GNSS receiver 130. Further, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Further, the radio transceiver 110 converts the radio signal received by the antenna 101 into the baseband signal, and outputs the baseband signal to the processor 160.

The user interface 120 is an interface with a user carrying the UE 100, and includes, a display, a microphone, a speaker, and various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 executes various processes and various communication protocols described later.

FIG. 3 is a block diagram of the eNB 200. As shown in FIG. 3, the eNB 200 includes an antenna 201, a radio transceiver 210, a network interface 220, a memory 230, and a processor 240. The memory 230 and the processor 240 constitute a controller.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Further, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like of the baseband signal and a CPU that performs various processes by executing the program stored in the memory 230. The processor 240 executes various processes and various communication protocols described later.

Figure 4:
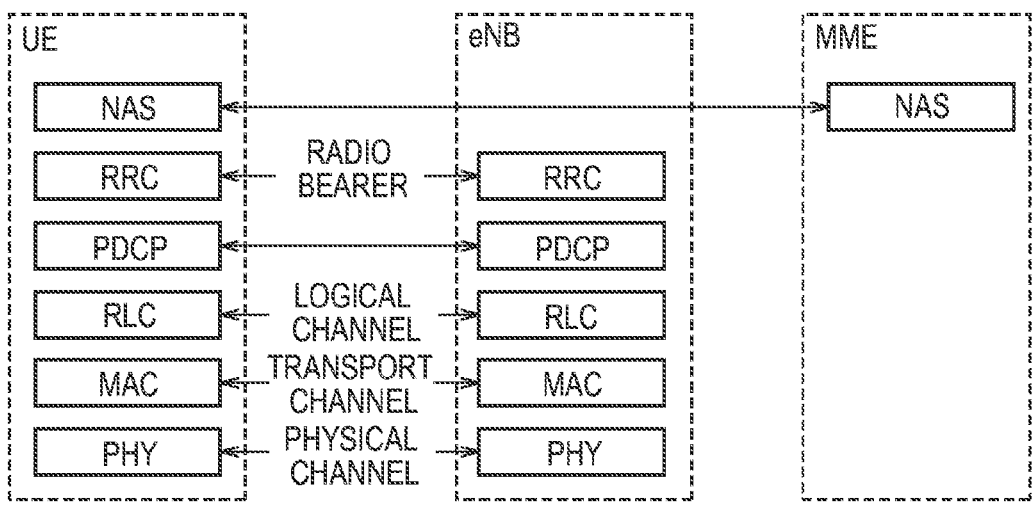
FIG. 4 is a protocol stack diagram of a radio interface in the LTE system.

FIG. 4 is a protocol stack diagram of a radio interface in the LTE system. As shown in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for determining a transport format (a transport block size, a modulation and coding scheme (MCS)) of an uplink and a downlink, and an assigned resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), and when there is no RRC connection, the UE 100 is in an idle state (an RRC idle state).

A NAS (Non-Access Stratum) layer positioned above the RRC layer performs session management or mobility management and the like.

Figure 5:
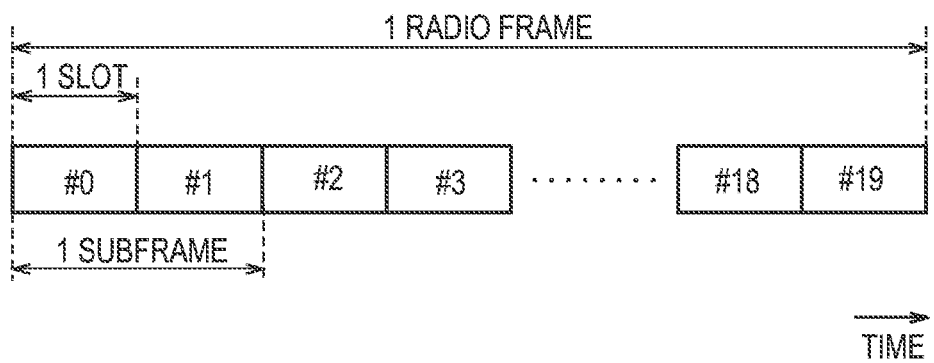
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As shown in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH) for transmitting a control signal. Further, the remaining interval of each subframe is a region mainly capable of being used as a physical downlink shared channel (PDSCH) for transmitting user data. Further, in the downlink, reference signals such as cell-specific reference signals (CRS) are distributed and arranged in each subframe.

In the uplink, both end portions in the frequency direction of each subframe are control regions mainly used as a physical uplink control channel (PUCCH) that transmits a control signal. Further, the central portion in the frequency direction of each subframe is a region mainly capable of being used as a physical uplink shared channel (PUSCH) for transmitting user data.

(D2D Communication)

The LTE system according to the first embodiment supports D2D communication that is direct communication between UEs. Hereinafter, the D2D communication will be described in comparison with normal communication (cellular communication) of the LTE system.

In the cellular communication, the data path passes through the EPC 20 that is the core network. The data path is a communication path of user data (a user plane). On the other hand, in the D2D communication, the data path set between UEs does not pass through the EPC 20. Therefore, it becomes possible to reduce a traffic load of the EPC 20.

The UE 100 discovers another UE existing in the vicinity of the UE 100 so as to start D2D communication. In the D2D communication, a direct communication mode and a locally routed mode are included.

Figure 6:
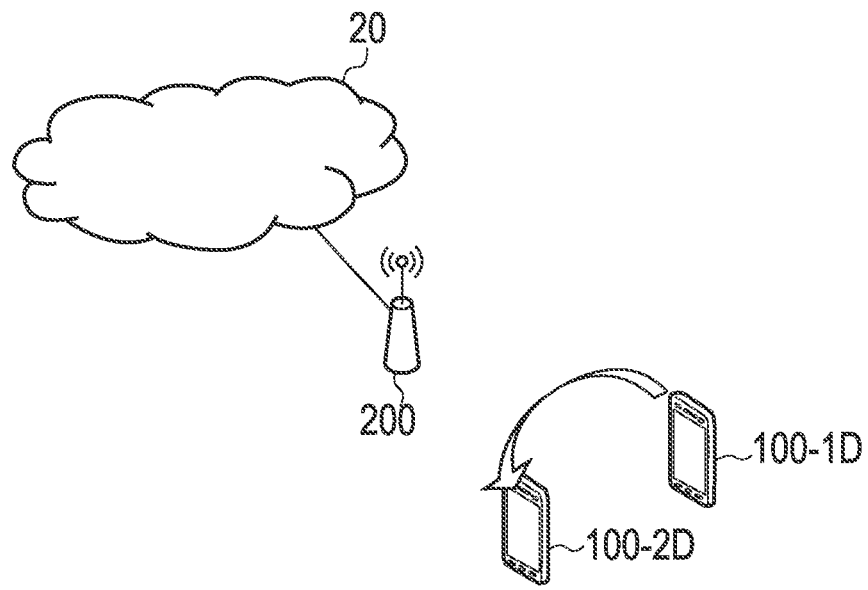
FIG. 6 is a diagram illustrating a direct communication mode in D2D communication.

FIG. 6 is a diagram illustrating the direct communication mode in the D2D communication. As shown in FIG. 6, in the direct communication mode, the data path does not pass through the eNB 200. In the cell of the eNB 200, UE 100-1D and UE 100-2D adjacent to each other directly perform the radio communication with low transmission power. As a result, advantages such as reduction of power consumption of the UE 100 and reduction of the interference to the neighboring cell are obtained.

Figure 7:
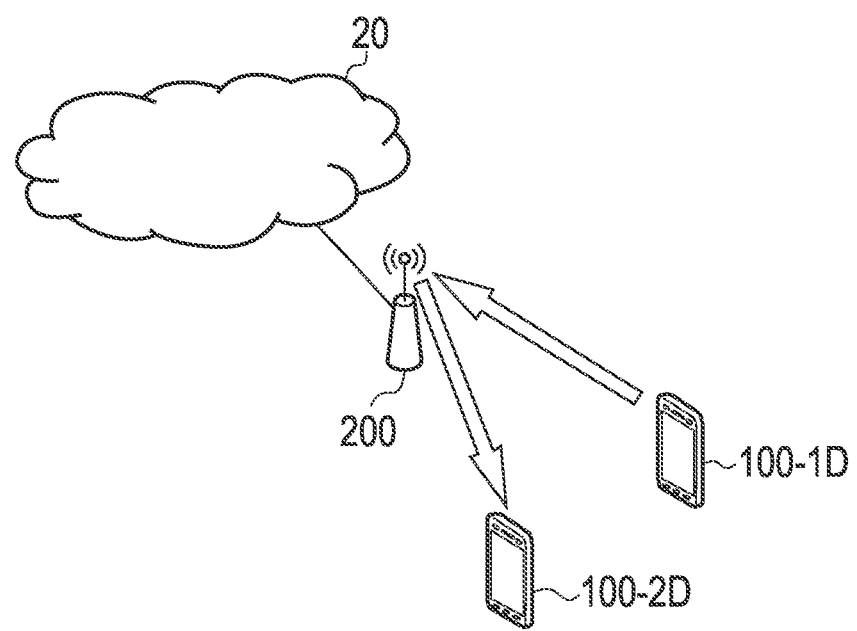
FIG. 7 is a diagram illustrating a locally routed mode in the D2D communication.

FIG. 7 is a diagram illustrating the locally routed mode in the D2D communication. As shown in FIG. 7, in the locally routed mode, the data path passes through the eNB 200 but not the EPC 20. That is, in the cell of the eNB 200, the UE 100-1D and the UE 100-2D perform the radio communication through the eNB 200 but not the EPC 20. In the locally routed mode, the traffic load of the EPC 20 is reduced, however, there are advantages fewer than the direct communication mode. Therefore, in the present embodiment, the direct communication mode will be mainly considered.

(Operation According to First Embodiment)

(1) Operation Overview

In the first embodiment, in view of improving frequency efficiency, a case where the D2D communication is performed within a frequency band (licensed band) of the LTE system is considered. In this case, the D2D communication is performed under management of the network.

Figure 8:
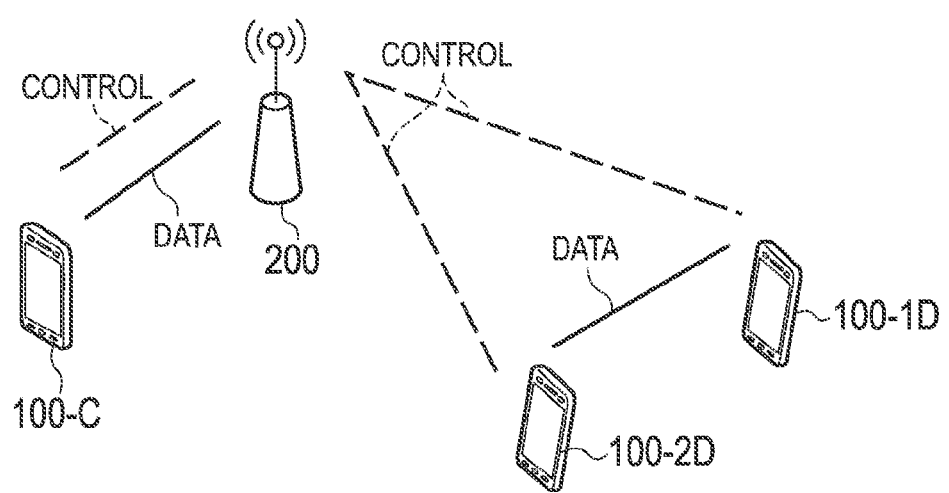
FIG. 8 is a diagram for explaining an operation environment according to the first embodiment to the third embodiment.

FIG. 8 is a diagram illustrating an operation environment according to the first embodiment. As shown in FIG. 8, UE 100-C is a cellular UE (a cellular terminal) that performs the cellular communication in the cell of the eNB200. The UE 100-C in a connected state performs the cellular communication by using the radio resource assigned from the eNB 200. The UE 100-C that performs the cellular communication exchanges the user data and the control signal with the eNB 200.

The UE 100-1D and the UE 100-2D are D2D UEs (D2D terminals) that perform the D2D communication in the cell of the eNB200. The UE 100-1D and the UE 100-2D in the connected state perform the D2D communication by using the radio resource assigned from the eNB 200. The UE 100-1D and the UE 100-2D that perform the D2D communication mutually exchange the user data, and exchange the control signal with the eNB 200.

Thus, in first embodiment, the cellular UE (the UE 100-C) and D2D UEs (the UE 100-1D and the UE 100-2D) exist in the same cell. However, a part of the D2D UEs included in a D2D UE group that perform the D2D communication may exist in or outside of another cell. For example, one of the UE 100-1D and the UE 100-2D may exist in or outside of a cell different from a cell in which the other D2D UE exists. Hereinafter, D2D UE existing in the same cell as that of the cellular UE 100-C is called "D2D UE 100-D", where appropriate.

When the D2D communication is performed within the frequency band of the LIE system, in order to ensure a radio resource (a D2D radio resource) to be assigned to the D2D communication, there are used two assignment modes which are a dedicated resource assignment mode and a shared resource assignment mode.

Figure 9:
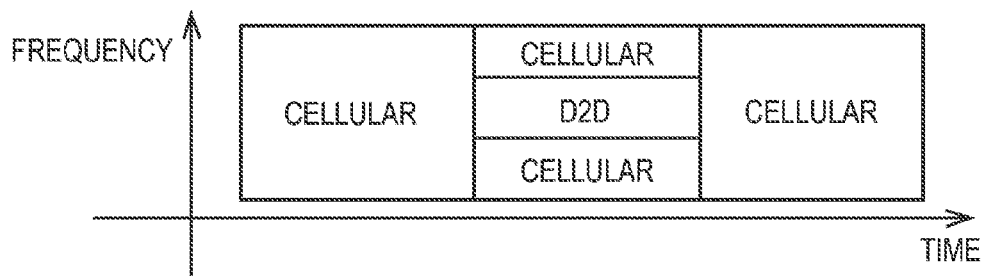
FIG. 9 is a diagram illustrating a dedicated resource assignment mode.

FIG. 9 is a diagram illustrating the dedicated resource assignment mode. As shown in FIG. 9, in the dedicated resource assignment mode, the D2D radio resource is not used also as a radio resource (a cellular radio resource) to be assigned to the cellular communication. In the example of FIG. 9, among radio resources (specifically, time and frequency resources) corresponding to three subframes, several central resource blocks in the central subframe are ensured as the D2D radio resource. In this case, the D2D radio resource is a radio resource dedicated for the D2D communication (a dedicated radio resource). According to the dedicated resource assignment mode, it is possible to avoid interference between the cellular communication and the D2D communication, however, there is a problem that the usage efficiency of a radio resource becomes poor because the cellular radio resource is relatively reduced.

Figure 10:
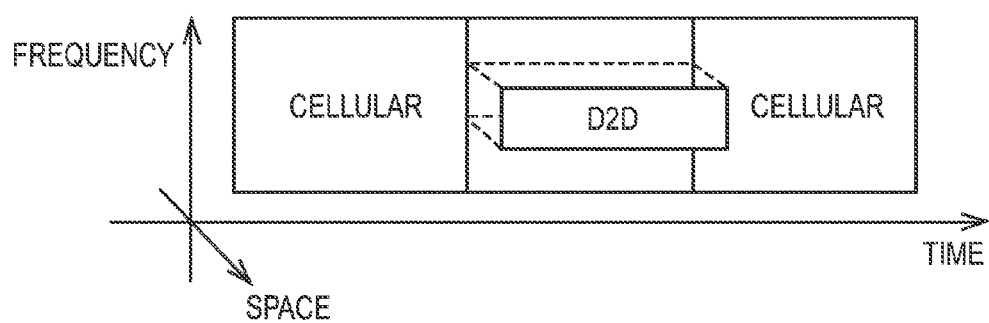
FIG. 10 is a diagram illustrating a shared resource assignment mode.

FIG. 10 is a diagram illustrating the shared resource assignment mode. As shown in FIG. 10, in the shared resource assignment mode, the D2D radio resource is used also as the cellular radio resource. In the example of FIG. 10, among the radio resources corresponding to three subframes, several central resource blocks in the central subframe are also used as the D2D radio resource as well as the cellular radio resource. In this case, the D2D radio resource is a radio resource shared with the cellular communication (a shared radio resource). The D2D radio resource is spatially separated from the cellular radio resource. According to the shared resource assignment mode, the usage efficiency of a radio resource is high, however, there is a problem that interference easily occurs between the cellular communication and the D2D communication, i.e., communication quality is easily deteriorated.

Then, in the eNB 200 according to the first embodiment, the dedicated resource assignment mode and the shared resource assignment mode are selectively used in an appropriate manner, and therefore, an influence of interference is suppressed while improving the usage efficiency of the radio resource. Specifically, the eNB 200 performs assignment determination as to whether the dedicated radio resource not shared with the cellular communication is assigned to the D2D UE 100-D (the dedicated resource assignment mode) or the shared radio resource shared with the cellular communication is assigned to the D2D UE 100-D (the shared resource assignment mode). As a criterion when the assignment determination is performed, a variety of criteria may be applied.

In following operation patterns 1 to 5, a specific example of a criterion used when the assignment determination is performed is described. It is noted that, the operation patterns 1 to 5 may be separately and independently performed, and may be performed by combining at least two operation patterns.

(2) Operation Pattern 1

In the operation pattern 1 of the first embodiment, the eNB 200 performs the assignment determination on the basis of an amount of radio resource to be used in the cell in which the D2D UE 100-D exists. In this case, the eNB 200 corresponds to a communication apparatus that performs the assignment determination. The amount of radio resource to be used is the number of resource blocks to be used or a ratio of resource blocks to be used, for example.

Firstly, the eNB 200 monitors the amount of radio resource to be used in the cell of the eNB 200 when the D2D UE 100-D exists in the cell.

Secondary, the eNB 200 compares the amount of radio resource to be used in the cell in which the D2D UE 100-D exists, with a threshold value. The threshold value may be previously held by the eNB 200, and may be notified from a network node included in the EPC 20 to the eNB 200.

Thirdly, the eNB 200 performs the assignment determination corresponding to a result obtained by comparing, with the threshold value, the amount of radio resource to be used in the cell in which the D2D UE 100-D exists.

The eNB 200 determines to apply the dedicated resource assignment mode to the D2D UE 100-D when the amount of radio resource to be used in the cell in which the D2D UE 100-D exists does not exceed the threshold value. Thereby, when there is a surplus in the radio resource of the cell, the dedicated resource assignment mode is applied to the D2D UE 100-D so as to deal with the communication quality being deteriorated resulting from the interference. In view of also a temporal variation, when the amount of radio resource to be used does not exceed the threshold value and a duration of the state exceeds a predetermined time period, it may be determined that the dedicated resource assignment mode is applied to the D2D UE 100-D.

Moreover, the eNB 200 determines to apply the shared resource assignment mode to the D2D UE 100-D when the amount of radio resource to be used in the cell in which the D2D UE 100-D exists exceeds the threshold value. Thereby, when the radio resource of the cell is insufficient, the shared resource assignment mode is applied to the D2D UE 100-D and the usage efficiency of the radio resource is improved. In view of also a temporal variation, when the amount of radio resource to be used exceeds the threshold value and a duration of the state exceeds the predetermined time period, it may be determined that the shared resource assignment mode is applied to the D2D UE 100-D.

Fourthly, the eNB 200 assigns the D2D radio resource to the D2D UE 100-D corresponding to a result of the assignment determination. When the dedicated resource assignment mode is applied to the D2D UE 100-D, the eNB 200 assigns the dedicated radio resource to the D2D UE 100-D as the D2D radio resource. In contrary, when the shared resource assignment mode is applied to the D2D UE 100-D, the eNB 200 assigns the shared radio resource to the D2D UE 100-D as the D2D radio resource.

It is noted that, in the operation pattern 1 of the first embodiment, the eNB 200 uses overall amount of radio resource to be used in the cell in which the D2D UE 100-D exists, as a criteria, however, an uplink radio resource and a downlink radio resource of the cell may be individually used as the criteria. Here, the uplink radio resource is a radio resource secured for the cellular communication in the uplink. The downlink radio resource is a radio resource secured for the cellular communication in the downlink.

When the uplink radio resource and the downlink radio resource are individually determined, the eNB 200 may further determine whether the D2D radio resource should be provided within the uplink radio resource or the downlink radio resource. For example, when an amount of the downlink radio resource to be used is greater than an amount of the uplink radio resource to be used, the eNB 200 determines to provide the D2D radio resource within the uplink radio resource. In contrary, when the amount of the uplink radio resource to be used is greater than the amount of the downlink radio resource to be used, the eNB 200 determines to provide the D2D radio resource within the downlink radio resource.

Moreover, a determiner for the assignment determination is not limited to the eNB 200, and may be the network node included in the EPC 20. The eNB 200 notifies the network node of the amount of radio resource to be used in the cell in which the D2D UE 100-D exists. The network node performs the assignment determination on the basis of the notification and notifies the eNB 200 of a determination result. In this case, the network node corresponds to the communication apparatus that performs the assignment determination.

Further, when the D2D UE 100-D has a part of a decision right of the D2D radio resource, the determiner for the assignment determination may be the D2D UE 100-D. The eNB 200 previously notifies the D2D UE 100-D of a D2D radio resource capable of being used as the dedicated radio resource (D2D radio resource candidate) and a D2D radio resource capable of being used as the shared radio resource (D2D radio resource candidate). Then, when appropriate, the eNB 200 notifies the D2D UE 100-D of an amount of radio resource to be used in the cell. The D2D UE 100-D performs the assignment determination on the basis of the notified used amount. In this case, the D2D UE 100-D corresponds to the communication apparatus that performs the assignment determination.

(3) Operation Pattern 2

In the operation pattern 2 of the first embodiment, the eNB 200 performs the assignment determination on the basis of a communication quality of the D2D communication. In this case, the eNB 200 corresponds to a communication apparatus that performs the assignment determination. The communication quality of the D2D communication is QoS (a packet loss ratio, a throughput, etc.) or a radio quality (SNR, interference power, etc.), for example.

Firstly, the D2D UE 100-D measures the communication quality of the D2D communication, and reports the communication quality of the D2D communication to the eNB 200. The D2D UE 100-D may report the communication quality of the D2D communication to the eNB 200 by a predetermined trigger or at fixed intervals.

Secondary, the eNB 200 compares the reported communication quality of the D2D communication with the threshold value. The threshold value may be previously held by the eNB 200, and may be notified from a network node included in the EPC 20 to the eNB 200. The threshold value may be used as a value in which an offset is added to a communication quality required for the D2D communication (a required communication quality), for example.

Thirdly, the eNB 200 performs the assignment determination corresponding to a result obtained by comparing the communication quality of the D2D communication with the threshold value.

The eNB 200 determines to apply the dedicated resource assignment mode to the D2D UE 100-D when the communication quality of the D2D communication does not exceed the threshold value. Thereby, when the communication quality of the D2D communication should be improved, the dedicated resource assignment mode is applied to the D2D UE 100-D so as to deal with the communication quality being deteriorated resulting from the interference. In view of also a temporal variation, when the communication quality of the D2D communication does not exceed the threshold value and a duration of the state exceeds the predetermined time period, it may be determined that the dedicated resource assignment mode is applied to the D2D UE 100-D.

Moreover, the eNB 200 determines to apply the shared resource assignment mode to the D2D UE 100-D when the communication quality of the D2D communication exceeds the threshold value. Thereby, when the communication quality of the D2D communication is sufficient, the shared resource assignment mode is applied to the D2D UE 100-D, and the usage efficiency of the radio resource is improved. In view of also a temporal variation, when the communication quality of the D2D communication exceeds the threshold value and a duration of the state exceeds the predetermined time period, it may be determined that the shared resource assignment mode is applied to the D2D UE 100-D.

Fourthly, the eNB 200 assigns the D2D radio resource to the D2D UE 100-D corresponding to a result of the assignment determination. When the dedicated resource assignment mode is applied to the D2D UE 100-D, the eNB 200 assigns the dedicated radio resource to the D2D UE 100-D as the D2D radio resource. In contrary, when the shared resource assignment mode is applied to the D2D UE 100-D, the eNB 200 assigns the shared radio resource to the D2D UE 100-D as the D2D radio resource.

It is noted that the determiner for the assignment determination is not limited to the eNB 200, and may be the network node included in the EPC 20. The eNB 200 notifies the network node of the communication quality of the D2D communication. The network node performs the assignment determination on the basis of the notification and notifies the eNB 200 of a determination result. In this case, the network node corresponds to the communication apparatus that performs the assignment determination.

Further, when the D2D UE 100-D has a part of a decision right of the D2D radio resource, the determiner for the assignment determination may be the D2D UE 100-D. The eNB 200 previously notifies the D2D UE 100-D of a D2D radio resource capable of being used as the dedicated radio resource (D2D radio resource candidate) and a D2D radio resource capable of being used as the shared radio resource (D2D radio resource candidate). The D2D UE 100-D performs the assignment determination on the basis of the communication quality of the D2D communication. In this case, the D2D UE 100-D corresponds to the communication apparatus that performs the assignment determination.

(4) Operation Pattern 3

In the operation pattern 3 of the first embodiment, in a case when the D2D radio resource is provided within the uplink radio resource, the eNB 200 performs the assignment determination on the basis of a pathloss between the D2D UE 100-D and another device. In the operation pattern 3, a case when "another device" is mainly a cellular UE 100-C is described. When the D2D radio resource is provided within the uplink radio resource and when the cellular UE 100-C exists near the D2D UE 100-D, the D2D communication is largely interfered by a transmission signal (an uplink signal) of the cellular UE 100-C. Therefore, in the operation pattern 3, the assignment determination in which the interference is considered is performed.

Firstly, a pathloss between the D2D UE 100-D and the cellular UE 100-C is estimated, and the estimated pathloss is reported to the eNB 200 by the D2D UE 100-D. Otherwise, the pathloss between the D2D UE 100-D and the cellular UE 100-C is estimated, and the estimated pathloss is reported to the eNB 200 by the cellular UE 100-C. The pathloss (the pathloss between the D2D UE 100-D and the cellular UE 100-C) is estimated by calculating a difference between known transmission power and the measured received power. The D2D UE 100-D and/or the cellular UE 100-C may report the estimated pathloss to the eNB 200 by a predetermined trigger or at fixed intervals. Instead of reporting the pathloss, information on the pathloss (e.g. received power or transmission power) may be reported.

Secondary, the eNB 200 compares the pathloss between the D2D UE 100-D and the cellular UE 100-C with the threshold value. The threshold value may be previously held by the eNB 200, and may be notified from a network node included in the EPC 20 to the eNB 200. Instead of comparison of the pathloss, the comparison of information on the pathloss (e.g. received power) may be used. The same shall apply hereafter.

Thirdly, the eNB 200 performs the assignment determination corresponding to a result obtained by comparing the pathloss between the D2D UE 100-D and the cellular UE 100-C with the threshold value.

The eNB 200 determines to apply the dedicated resource assignment mode to the D2D UE 100-D when the pathloss between the D2D UE 100-D and the cellular UE 100-C does not exceed the threshold value. Thereby, under a state where the cellular UE 100-C exists near the D2D UE 100-D, the dedicated resource assignment mode is applied to the D2D UE 100-D so as to deal with the communication quality being deteriorated resulting from the interference. In view of also a temporal variation, when the pathloss does not exceed the threshold value and a duration of the state exceeds the predetermined time period, it may be determined that the dedicated resource assignment mode is applied to the D2D UE 100-D.

Moreover, the eNB 200 determines to apply the shared resource assignment mode to the D2D UE 100-D when the pathloss between the D2D UE 100-D and the cellular UE 100-C exceeds the threshold value. Thereby, under a state when the cellular UE 100-C does not exist near the D2D UE 100-D, the shared resource assignment mode is applied to the D2D UE 100-D, and the usage efficiency of the radio resource is improved. In view of also a temporal variation, when the pathloss exceeds the threshold value and a duration of the state exceeds the predetermined time period, it may be determined that the shared resource assignment mode is applied to the D2D UE 100-D.

Fourthly, the eNB 200 assigns the D2D radio resource to the D2D UE 100-D corresponding to a result of the assignment determination. When the dedicated resource assignment mode is applied to the D2D UE 100-D, the eNB 200 assigns the dedicated radio resource to the D2D UE 100-D as the D2D radio resource. In contrary, when the shared resource assignment mode is applied to the D2D UE 100-D, the eNB 200 assigns the shared radio resource to the D2D UE 100-D as the D2D radio resource.

Further, the eNB 200 may perform the assignment determination on the basis of a relative position of the D2D UE 100-D and the cellular UE 100-C with respect to the eNB 200. That is, when the D2D UE 100-D and the cellular UE 100-C are placed on a line with certain width and it is farther to the cellular UE 100-C than to the D2D UE 100-D, viewed from the eNB 200, the interference becomes large, and therefore, it is determined that the dedicated resource assignment mode is applied to the D2D UE 100-D. Specifically, when a difference between an angle formed by the eNB 200 and the D2D UE 100-D and an angle formed by the eNB 200 and the cellular UE 100-C is small, and when a distance between the eNB 200 and the cellular UE 100-C is larger than a distance between the eNB 200 and the D2D UE 100-D, it is determined that the dedicated resource assignment mode is applied to the D2D UE 100-D. For example, the eNB 200 may acquire location information of each of the D2D UE 100-D and the cellular UE 100-C so as to estimate the angle and the distance on the basis of the location information. Moreover, the eNB 200 may acquire a direction from which each signal of the D2D UE 100-D and the cellular UE 100-C arrives so as to estimate the angle on the basis of the acquired direction. Further, the eNB 200 may acquire a pathloss between the D2D UE 100-D and the eNB 200 and a pathloss between the cellular UE 100-C and the eNB 200, so as to estimate the distance on the basis of the acquired pathlosses.

Further, the eNB 200 may perform the assignment determination in consideration of the D2D UE 100-D and also another D2D UE 100-D that is not a communication partner of the D2D UE 100-D. "Another D2D UE 100-D that is not a communication partner of the D2D UE 100-D" is D2D UE 100-D belonging to another D2D UE group different from the D2D UE group that includes the D2D UE 100-D and the communication partner thereof.

As a summary of the above, in the operation pattern 3, the shared resource assignment mode is applied when a following condition 1 is satisfied and a following condition 2 is not satisfied. Otherwise, the dedicated resource assignment mode is applied.

Condition 1: A pathloss or a distance between the D2D UE 100-D and another UE (the cellular UE 100-C or another D2D UE 100-D that is not the communication partner of the D2D UE 100-D) exceeds the threshold value.

Condition 2: A difference between an angle formed by the eNB 200 and the D2D UE 100-D and an angle formed by the eNB 200 and another UE (same as above) is small, and a distance between the eNB 200 and another UE (same as above) is larger than a distance between the eNB 200 and the D2D UE 100-D.

Figure 11:
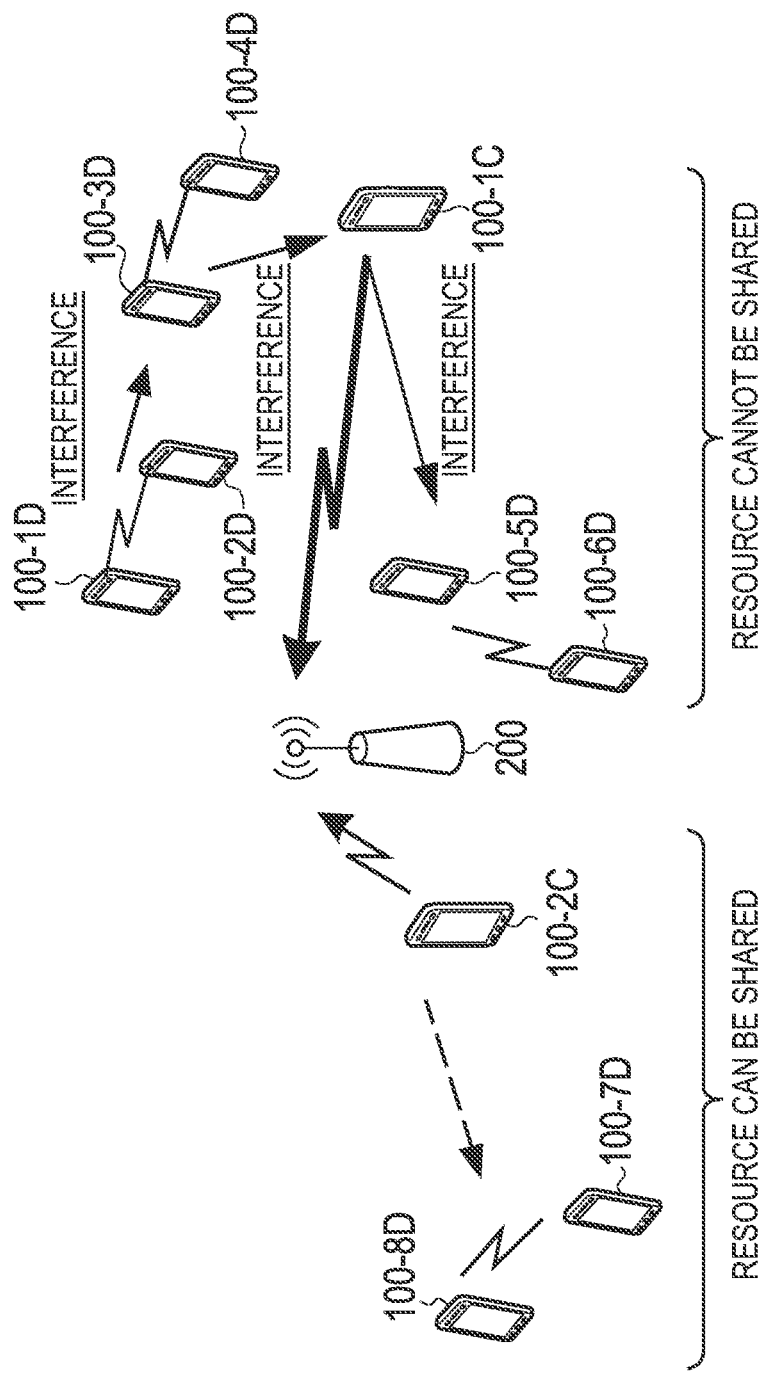
FIG. 11 is a diagram illustrating a specific determination method according to an operation pattern 3 in the first embodiment.

FIG. 11 is a diagram illustrating a specific determination method according to the operation pattern 3.

As shown in FIG. 11, each of the UE 100-1D to the UE 100-8D is the D2D UE. Each of the UE 100-1C and the UE 100-2C is the cellular UE. The UE 100-1D performs the D2D communication with the UE 100-2D, the UE 100-3D performs the D2D communication with the UE 100-4D, the UE 100-5D performs the D2D communication with the UE 100-6D, and the UE 100-7D performs the D2D communication with the UE 100-8D.

Here, in the D2D UE group that includes the UE 100-7D and the UE 100-8D, the above-described condition 1 is satisfied and the above-described condition 2 is not satisfied. Therefore, the eNB 200 determines to apply the shared resource assignment mode to the D2D UE group.

In contrary, in the D2D UE group that includes the UE 100-1D and the UE 100-2D and the D2D UE group that includes the UE 100-3D and the UE 100-4D, the above-described condition 1 is not satisfied. Therefore, the eNB 200 determines to apply the dedicated resource assignment mode to each of the D2D UE groups.

Moreover, in the D2D UE group that includes the UE 100-5D and the UE 100-6D, the above-described condition 2 is satisfied. Therefore, the eNB 200 determines to apply the dedicated resource assignment mode to the D2D UE group.

It is noted that, the determiner for the assignment determination is not limited to the eNB 200, and may be the network node included in the EPC 20 or the D2D UE. The eNB 200 notifies the network node or the D2D UE 100-D of variety of information. The network node or the D2D UE 100-D performs the assignment determination on the basis of the notification. In this case, the network node or the D2D UE 100-D corresponds to the communication apparatus that performs the assignment determination.

(5) Operation Pattern 4

In the operation pattern 4 of the first embodiment, when the D2D radio resource is provided within the downlink radio resource, the eNB 200 performs the assignment determination on the basis of the pathloss between the D2D UE 100-D and another device. In the operation pattern 4, a case where "another device" is mainly the eNB 200 is described. When the D2D radio resource is provided within the downlink radio resource and when the D2D UE 100-D exists near the eNB 200, the D2D communication is largely interfered by a transmission signal (a downlink signal) of the eNB 200. Therefore, in the operation pattern 4, the assignment determination in which the interference is considered is performed.

Firstly, a pathloss between the D2D UE 100-D and the eNB 200 is estimated, and the estimated pathloss is reported to the eNB 200 by the D2D UE 100-D. Otherwise, the pathloss between the eNB 200 and the D2D UE 100-D is estimated by the eNB 200. The pathloss (the pathloss between the D2D UE 100-D and the eNB 200) is estimated by calculating a difference between known transmission power and the measured received power. The D2D UE 100-D may report the estimated pathloss to the eNB 200 by a predetermined trigger or at fixed intervals.

Secondary, the eNB 200 compares the pathloss between the D2D UE 100-D and the eNB 200 with the threshold value. The threshold value may be previously held by the eNB 200, and may be notified from a network node included in the EPC 20 to the eNB 200.

Thirdly, the eNB 200 performs the assignment determination corresponding to a result obtained by comparing the pathloss between the D2D UE 100-D and the eNB 200 with the threshold value.

The eNB 200 determines to apply the dedicated resource assignment mode to the D2D UE 100-D when the pathloss between the D2D UE 100-D and the eNB 200 does not exceed the threshold value. Thereby, under a state where the eNB 200 exists near the D2D UE 100-D, the dedicated resource assignment mode is applied to the D2D UE 100-D so as to deal with the communication quality being deteriorated resulting from the interference. In view of also a temporal variation, when the pathloss does not exceed the threshold value and a duration of the state exceeds the predetermined time period, it may be determined that the dedicated resource assignment mode is applied to the D2D UE 100-D.

Moreover, the eNB 200 determines to apply the shared resource assignment mode to the D2D UE 100-D when the pathloss between the D2D UE 100-D and the eNB 200 exceeds the threshold value. Thereby, under a state when the eNB 200 does not exist near the D2D UE 100-D, the shared resource assignment mode is applied to the D2D UE 100-D, and the usage efficiency of the radio resource is improved. In view of also a temporal variation, when the pathloss exceeds the threshold value and a duration of the state exceeds the predetermined time period, it may be determined that the shared resource assignment mode is applied to the D2D UE 100-D.

Fourthly, the eNB 200 assigns the D2D radio resource to the D2D UE 100-D corresponding to a result of the assignment determination. When the dedicated resource assignment mode is applied to the D2D UE 100-D, the eNB 200 assigns the dedicated radio resource to the D2D UE 100-D as the D2D radio resource. In contrary, when the shared resource assignment mode is applied to the D2D UE 100-D, the eNB 200 assigns the shared radio resource to the D2D UE 100-D as the D2D radio resource.

Further, the eNB 200 may perform the assignment determination in consideration of a pathloss or a distance between the D2D UE 100-D and another UE (the cellular UE 100-C or another D2D UE 100-D that is not the communication partner of the D2D UE 100-D). That is, similarly to the operation pattern 3, the eNB 200 applies the dedicated resource assignment mode when the pathloss or the distance between the D2D UE 100-D and another UE (same as above) does not exceed the threshold value.

As a summary of the above, in the operation pattern 4, the shared resource assignment mode is applied when following conditions 1 and 2 are satisfied. Otherwise, the dedicated resource assignment mode is applied.

Condition 1: A pathloss or a distance between the D2D UE 100-D and the eNB 200 exceeds the threshold value.

Condition 2: A pathloss or a distance between the D2D UE 100-D and another UE (the cellular UE 100-C or another D2D UE 100-D that is not the communication partner of the D2D UE 100-D) exceeds the threshold value.

Figure 12:
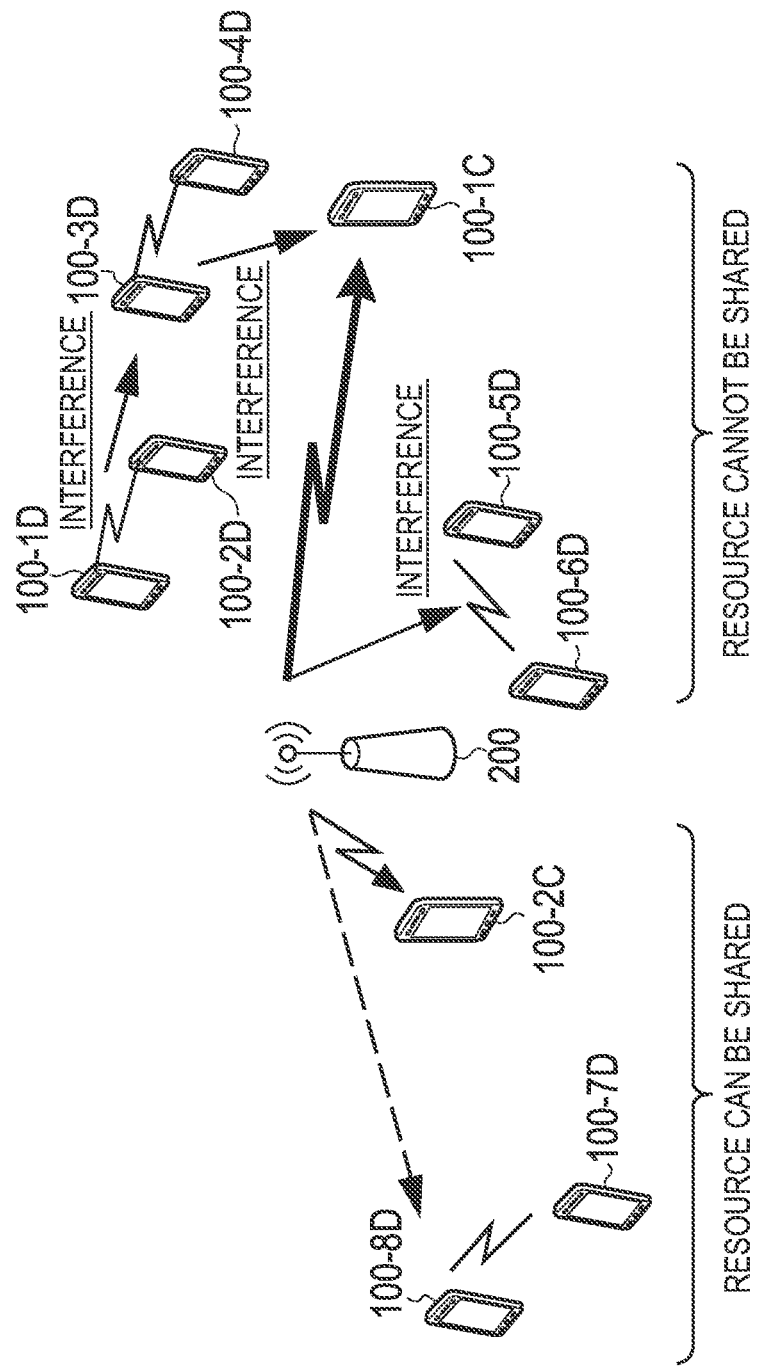
FIG. 12 is a diagram illustrating a specific determination method according to an operation pattern 4 of the first embodiment.

FIG. 12 is a diagram illustrating a specific determination method according to the operation pattern 4.

As shown in FIG. 12, each of the UE 100-1D to the UE 100-8D is the D2D UE. Each of the UE 100-1C and the UE 100-2C is the cellular UE. The UE 100-1D performs the D2D communication with the UE 100-2D, the UE 100-3D performs the D2D communication with the UE 100-4D, the UE 100-5D performs the D2D communication with the UE 100-6D, and the UE 100-7D performs the D2D communication with the UE 100-8D.

Here, in the D2D UE group that includes the UE 100-7D and the UE 100-8D, the above-described conditions 1 and 2 are satisfied. Therefore, the eNB 200 determines to apply the shared resource assignment mode to the D2D UE group.

In contrary, in the D2D UE group that includes the UE 100-1D and the UE 100-2D, the D2D UE group that includes the UE 100-3D and the UE 100-4D and the D2D UE group that includes the UE 100-5D and the UE 100-6D, at least one of the above-described conditions 1 and 2 is not satisfied. Therefore, the eNB 200 determines to apply the dedicated resource assignment mode to each of the D2D UE groups.

It is noted that, the determiner for the assignment determination is not limited to the eNB 200, and may be the network node included in the EPC 20 or the D2D UE 100-D. The eNB 200 notifies the network node or the D2D UE 100-D of variety of information. The network node or the D2D UE 100-D performs the assignment determination on the basis of the notification. In this case, the network node or the D2D UE 100-D corresponds to the communication apparatus that performs the assignment determination.

Further, instead of the aforementioned determination method, following determination method may be applied.

Firstly, the D2D UE 100-D measures received power of a reference signal (RSRP) received from the eNB 200 and received power of a discovery signal (referred to as DSRP) received from another D2D UE 100-D that is a communication partner of the D2D UE 100-D. The discovery signal is a signal for discovering (searching) a peripheral UE in order to perform the D2D communication.

Secondary, the communication apparatus (the eNB 200, the D2D UE 100-D or the network node) that performs the assignment determination compares the RSRP and the DSRP so as to perform the assignment determination. For example, the communication apparatus determines as follows.

RSRP≥DSRP+α: the dedicated resource assigning
RSRP<DSRP+α: the shared resource assigning Here, "α" is a predetermined offset. In the determination method, when received power in the D2D communication is sufficiently higher than received power from the eNB 200 (i.e., interference power), the shared resource assignment mode is applied to the D2D UE 100-D so as to improve the usage efficiency of the radio resource. Otherwise, the dedicated resource assignment mode is applied to the D2D UE 100-D so as to deal with the communication quality being deteriorated resulting from the interference.

(6) Operation Pattern 5

In the operation pattern 3 of the first embodiment, the eNB 200 performs the assignment determination on the basis of the pathloss between the D2D UE 100-D and another device. In the operation pattern 5, a case when "another device" is another D2D UE 100-D that is a communication partner of the D2D UE 100-D is described. As a distance (a pathloss) between D2D UE 100-Ds belonging to an identical D2D UE group becomes larger, the transmission power in the D2D communication becomes high, and as a result, the cellular communication is largely interfered by the D2D communication. Therefore, in the operation pattern 5, the assignment determination in which the interference is considered is performed.

Firstly, a pathloss between the D2D UE 100-D and D2D UE 100-D that is a communication partner is estimated, and the estimated pathloss is reported to the eNB 200 by the D2D UE 100-D. The pathloss (the pathloss between the D2D UE 100-Ds belonging to the identical D2D UE group) is estimated by calculating a difference between known transmission power and the measured received power. The D2D UE 100-D may report the estimated pathloss to the eNB 200 by a predetermined trigger or at fixed intervals.

Secondary, the eNB 200 compares the pathloss between the D2D UE 100-Ds belonging to the identical D2D UE group with the threshold value. The threshold value may be previously held by the eNB 200, and may be notified from a network node included in the EPC 20 to the eNB 200.

Thirdly, the eNB 200 performs the assignment determination corresponding to a result obtained by comparing the pathloss between the D2D UE 100-Ds belonging to the identical D2D UE group with the threshold value.

The eNB 200 determines to apply the shared resource assignment mode to the D2D UE 100-D when the pathloss between the D2D UE 100-Ds belonging to the identical D2D UE group does not exceed the threshold value. Thereby, under a state where the D2D UE 100-D that is the communication partner exists near the D2D UE 100-D, the shared resource assignment mode is applied to the D2D UE 100-D, and the usage efficiency of the radio resource is improved. In view of also a temporal variation, when the pathloss does not exceed the threshold value and a duration of the state exceeds the predetermined time period, it may be determined that the shared resource assignment mode is applied to the D2D UE 100-D.

Moreover, the eNB 200 determines to apply the dedicated resource assignment mode to the D2D UE 100-D when the pathloss between the D2D UE 100-Ds belonging to the identical D2D UE group exceeds the threshold value. Thereby, under a state where the D2D UE 100-D that is the communication partner exists far from the D2D UE 100-D, the dedicated resource assignment mode is applied to the D2D UE 100-D so as to deal with the communication quality being deteriorated resulting from the interference. In view of also a temporal variation, when the pathloss exceeds the threshold value and a duration of the state exceeds the predetermined time period, it may be determined that the dedicated resource assignment mode is applied to the D2D UE 100-D.

Fourthly, the eNB 200 assigns the D2D radio resource to the D2D UE 100-D corresponding to a result of the assignment determination. When the dedicated resource assignment mode is applied to the D2D UE 100-D, the eNB 200 assigns the dedicated radio resource to the D2D UE 100-D as the D2D radio resource. In contrary, when the shared resource assignment mode is applied to the D2D UE 100-D, the eNB 200 assigns the shared radio resource to the D2D UE 100-D as the D2D radio resource.

It is noted that, the determiner for the assignment determination is not limited to the eNB 200, and may be the network node included in the EPC 20 or the D2D UE 100-D. In this case, the network node or the D2D UE 100-D corresponds to the communication apparatus that performs the assignment determination.

Second Embodiment

Hereinafter, a second embodiment will be described while focusing on differences from the aforementioned first embodiment. In the second embodiment, on the basis of a mode in which the D2D radio resource can be used also for the cellular radio resource (the shared resource assignment mode), a countermeasure against interference is taken, so that communication quality is prevented from deteriorating while improving the use efficiency of the radio resource.

(1) Operation Overview

In the second embodiment, as shown in FIG. 8, an operation environment in which the cellular UE 100-C and D2D UE 100-D exist in the same cell is assumed. Moreover, it is assumed that the shared resource assignment mode is applied to the D2D UE 100-D. That is, the LTE system according to the second embodiment has the eNB 200, the cellular UE 100-C that performs the cellular communication in the cell of the eNB 200, and the D2D UE 100-D that performs the D2D communication in the cell by using the shared radio resource shared with the cellular communication.

At least one communication apparatus among the eNB 200, the cellular UE 100-C, and the D2D UE 100-D performs null steering so as to suppress an influence of interference between the cellular communication and the D2D communication. Here, the null steering means a control of directing a null (a dead point) of a directional pattern formed by using a plurality of antenna elements to an arbitrary direction. The null steering itself is a well-known technology, and therefore, an explanation for the general null steering is omitted.

In following operation patterns 1 to 4, a specific example of the null steering according to the second embodiment is described. The operation patterns 1 to 4 may be separately and independently performed, and may be performed by combining at least two operation patterns.

(2) Operation Pattern 1

In the operation pattern 1 of the second embodiment, a case where the D2D radio resource (the shared radio resource) is provided within the uplink radio resource is assumed.

Figure 13:
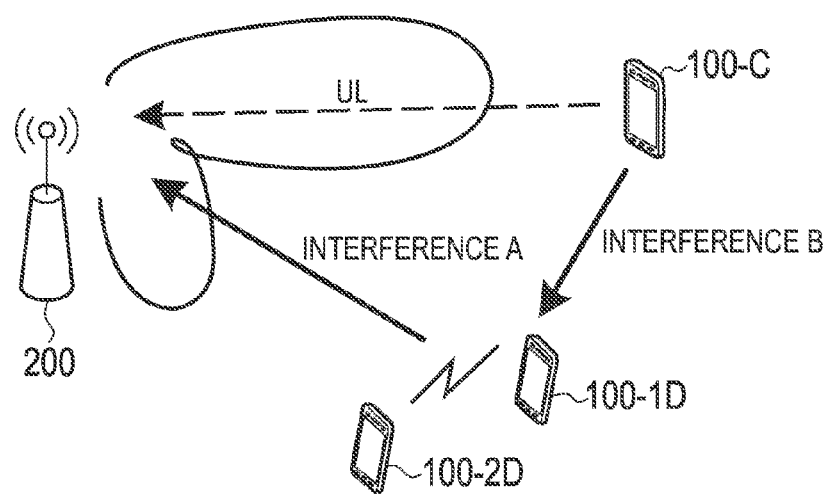
FIG. 13 is a diagram illustrating an operation pattern 1 according to the second embodiment.

FIG. 13 is a diagram illustrating the operation pattern 1. As shown in FIG. 13, when the transmission signal of the D2D UE 100-D is received by the eNB 200, there is a possibility that interference (interference A shown in FIG. 13) occurs between the D2D UE 100-D and the eNB 200. Moreover, when the transmission signal of the cellular UE 100-C (the uplink signal) is received by the D2D UE 100-D, there is a possibility that interference (interference B shown in FIG. 13) occurs between the D2D UE 100-D and the cellular UE 100-C. The operation pattern 1 is an operation pattern for suppressing an influence of the interference A.

Firstly, the D2D UE 100-D transmits a reference signal during the D2D communication. The reference signal is transmitted by using a known signal series and a known radio resource. The reference signal may be a reference signal for the D2D communication, and may be a reference signal for the cellular communication. SRS (Sounding Reference Signal) may be used as the reference signal for the cellular communication.

Secondary, when the reference signal is received from the D2D UE 100-D, the eNB 200 performs the null steering of directing the null to the D2D UE 100-D, on the basis of the received reference signal. For example, the eNB 200 performs the null steering by setting an antenna weight so that received power of a reference signal received from the D2D UE 100-D (i.e., interference power) becomes smaller. The antenna weight is called a precoder matrix in the LIE system. The eNB 200 is capable of suppressing the influence of the interference A shown in FIG. 13 by performing the null steering on at least receiving. However, the null steering may be similarly performed on transmitting.

(3) Operation Pattern 2

The operation pattern 2 in the second embodiment is an operation pattern for suppressing an influence of the interference (the interference B shown in FIG. 13) between the D2D UE 100-D and the cellular UE 100-C in a case when the D2D radio resource (the shared radio resource) is provided within the uplink radio resource.

Figure 14:
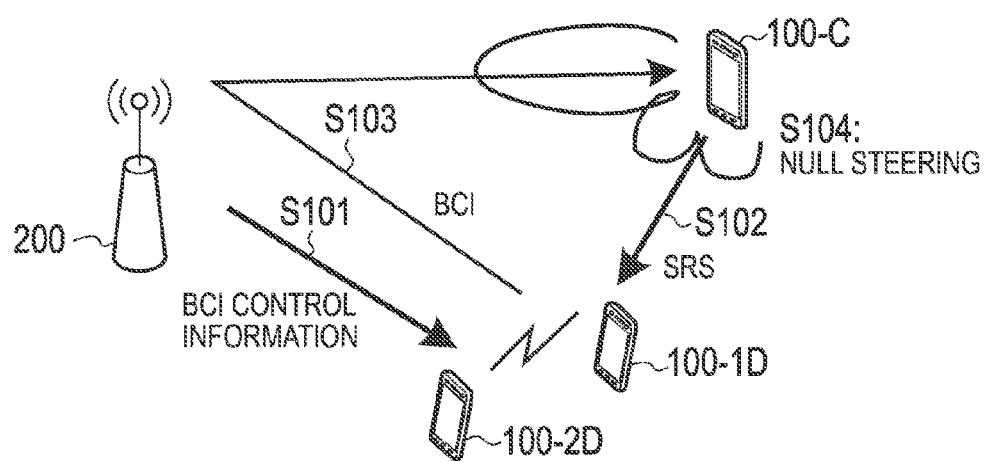
FIG. 14 is a diagram illustrating an operation pattern 2 according to the second embodiment.

FIG. 14 is a diagram illustrating the operation pattern 2. As shown in FIG. 14, firstly, the eNB 200 transmits BCI control information for setting transmission of BCI (Best Companion precoder matrix Indicator) to the D2D UE 100-D (step S101). The BCI is precoder matrix information indicating a precoder matrix in which the null is directed to the D2D UE 100-D.

Secondary, when a transmission signal is received from the cellular UE 100-C, the D2D UE 100-D selects the BCI on the basis of the received transmission signal. The SRS is capable of being used as the transmission signal of the cellular UE 100-C. The D2D UE 100-D holds a PMI group (a code book) that includes PMI (Precoder Matrix Indicator) corresponding to each of a plurality of precoder matrices, and selects, as the BCI, PMI in which the received power from the cellular UE 100-C (i.e., the interference power) becomes smallest, out of the code book.

Thirdly, the D2D UE 100-D transmits the selected BCI to the eNB 200 (step S103). The eNB 200 transfers the BCI transmitted from the D2D UE 100-D to the cellular UE 100-C. However, the BCI is not only notified from the D2D UE 100-D to the cellular UE 100-C through the eNB 200, but also may be directly notified from the D2D UE 100-D to the cellular UE 100-C without through the eNB 200.

Fourthly, the cellular UE 100-C performs the null steering of directing the null to the D2D UE 100-D by setting the precoder matrix indicated by the BCI notified from the D2D UE 100-D. The cellular UE 100-C is capable of suppressing the influence of the interference B shown in FIG. 13 by performing the null steering on at least transmitting. However, the null steering may be similarly performed on receiving. Specifically, the null is directed to the D2D UE 100-D by performing the transmission after setting the precoder matrix indicated by the BCI.

(4) Operation Pattern 3

In the operation pattern 3 of the second embodiment, a case where the D2D radio resource (the shared radio resource) is provided within the downlink radio resource is assumed.

Figure 15:
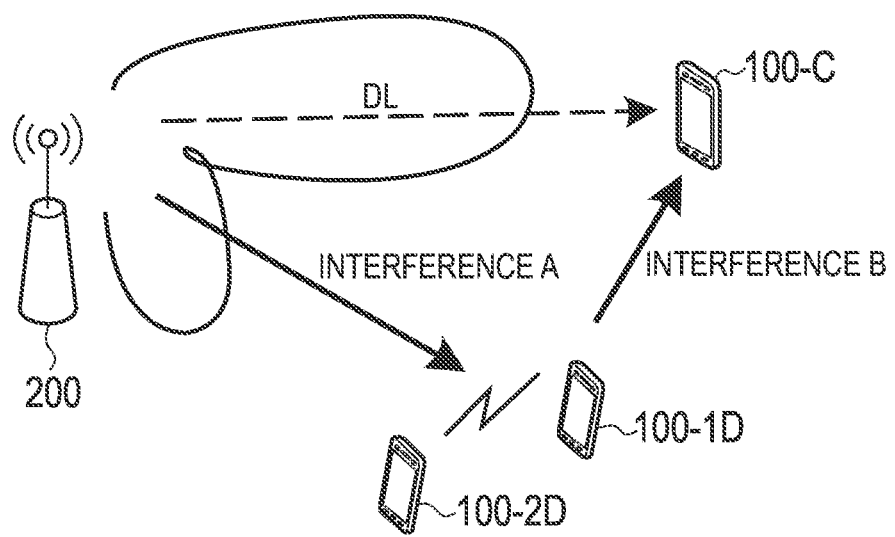
FIG. 15 is a diagram illustrating an operation pattern 3 according to the second embodiment.

FIG. 15 is a diagram illustrating the operation pattern 3. As shown in FIG. 15, when the transmission signal (a downlink signal) of the eNB 200 is received by the D2D UE 100-D, there is a possibility that interference (interference A shown in FIG. 15) occurs between the D2D UE 100-D and the eNB 200. Moreover, when the transmission signal of the D2D UE 100-D is received by the cellular UE 100-C, there is a possibility that interference (interference B shown in FIG. 15) occurs between the D2D UE 100-D and the cellular UE 100-C. The operation pattern 3 is an operation pattern for suppressing an influence of the interference A.

Firstly, the eNB 200 transmits a reference signal for the cellular communication. The reference signal for the cellular communication is transmitted by using a known signal series and a known radio resource. A CRS or CSI-RS (Channel State Information-Reference Signal) may be used as the reference signal for the cellular communication.

Secondary, when the reference signal is received from the eNB 200, the D2D UE 100-D selects the BCI (the precoder matrix information) for directing the null to the D2D UE 100-D, on the basis of the received reference signal. The D2D UE 100-D holds the PMI group (the code book) that includes the PMI corresponding to each of the plurality of precoder matrices, and selects, as the BCI, PMI in which the received power from the eNB 200 (i.e., the interference power) becomes smallest, out of the code book Thirdly, the D2D UE 100-D notifies the eNB 200 of the selected BCI.

Fourthly, the eNB 200 performs the null steering of directing the null to the D2D UE 100-D by setting the precoder matrix indicated by the BCI notified from the D2D UE 100-D. The eNB 200 is capable of suppressing the influence of the interference A shown in FIG. 15 by performing the null steering on at least transmitting. However, the null steering may be similarly performed on receiving.

It is noted that, when the eNB 200 performs beamforming to the cellular UE 100-C, following operation may be added in order to achieve both the beamforming and the null steering. Here, the beamforming means a control of directing a beam (a main lobe) of a directional pattern formed by using a plurality of antenna elements to an arbitrary direction. The beamforming itself is a well-known technology, and therefore, an explanation for the general beamforming is omitted.

When the reference signal is received from the eNB 200, the cellular UE 100-C selects the PMI (the precoder matrix information) for directing the beam to the cellular UE 100-C, on the basis of the received reference signal. The cellular UE 100-C holds the PMI group (the code book) that includes the PMI corresponding to each of the plurality of precoder matrices, and selects PMI in which the received power from the eNB 200 (i.e., desired wave power) becomes greatest, out of the code book. Then, the cellular UE 100-C notifies the eNB 200 of the selected PMI. Actually, a plurality of PMIs are notified to the eNB 200 from a plurality of cellular UEs 100-C.

The eNB 200 receives the BCI transmitted from the D2D UE 100-D and the PMI transmitted from the cellular UE 100-C. Then, the eNB 200 specifies the cellular UE 100-C that notified the PMI coincident with the BCI notified from the D2D UE 100-D, and assigns an identical radio resource to each of the specified cellular UE 100-C and the D2D UE 100-D. Thereafter, the eNB 200 performs transmission to the cellular UE 100-C by using the coincident BCI (PMI). As a result, formed is a directional pattern in which the null is directed to the D2D UE 100-D and the beam is directed to the cellular UE 100-C. Therefore, it becomes possible to achieve both the null steering and the beamforming.

(5) Operation Pattern 4

The operation pattern 4 in the second embodiment is an operation pattern for suppressing an influence of the interference (the interference B shown in FIG. 15) between the D2D UE 100-D and the cellular UE 100-C in a case where the D2D radio resource (the shared radio resource) is provided within the downlink radio resource.

Firstly, the eNB 200 transmits the BCI control information for setting transmission of the BCI (Best Companion precoder matrix Indicator) to the cellular UE 100-C. The BCI is precoder matrix information indicating a precoder matrix in which the null is directed to the cellular UE 100-C.

Secondary, when a transmission signal is received from the D2D UE 100-D, the cellular UE 100-C selects the BCI on the basis of the received transmission signal. The cellular UE 100-C holds a PMI group (a code book) that includes PMI (precoder Matrix Indicator) corresponding to each of a plurality of precoder matrices, and selects, as the BCI, PMI in which the received power from the D2D UE 100-D (i.e., the interference power) becomes smallest, out of the code book.

Thirdly, the cellular UE 100-C transmits, to the eNB 200, the selected BCI. The eNB 200 transfers the BCI transmitted from the D2D UE 100-D to the D2D UE 100-D. However, the BCI is not only notified from the cellular UE 100-C to the D2D UE 100-D through the eNB 200, but also may be directly notified from the cellular UE 100-C to the D2D UE 100-D without through the eNB 200.

Fourthly, the D2D UE 100-D performs the null steering of directing the null to the cellular UE 100-C by setting the precoder matrix indicated by the BCI notified from the cellular UE 100-C. The D2D UE 100-D is capable of suppressing the influence of the interference B shown in FIG. 15 by performing the null steering on at least transmitting. However, the null steering may be similarly performed on receiving.

Third Embodiment

Hereinafter, a third embodiment will be described while focusing on differences from the aforementioned first embodiment and second embodiment. In the present embodiment, on the basis of the operation method (the second operation method) in which the D2D radio resource can be used also for the cellular radio resource, a countermeasure against interference is taken, so that communication quality is prevented from deteriorating while improving the use efficiency of a radio resource.

(1) Operation Overview

In the third embodiment, as shown in FIG. 8, the operation environment in which the cellular UE 100-C and the D2D UE 100-D exist in the same cell is assumed. Moreover, it is assumed that the shared resource assignment mode is applied to the D2D UE 100-D. That is, the LTE system according to the third embodiment has the eNB 200, the cellular UE 100-C that performs the cellular communication in the cell of the eNB 200, and the D2D UE 100-D that performs the D2D communication in the cell by using the shared radio resource shared with the cellular communication.

The D2D UE 100-D notifies the eNB 200 of a D2D communication pathloss indicating a pathloss between the D2D UE 100-D and another D2D UE 100-D that is the communication partner of the D2D UE 100-D. Instead of notifying the pathloss, information on the pathloss (e.g. received power or transmission power) may be notified. On the basis of information on the D2D communication pathloss, the eNB 200 controls transmission power of at least one of the cellular UE 100-C, the eNB 200, and the D2D UE 100-D, so as to suppress the influence of interference between the cellular communication and the D2D communication. Moreover, on the basis of the D2D communication pathloss, not only the transmission power, but also the MCS may be controlled.

In following operation patterns 1 to 4, a specific example of a transmission power control (and the MCS control) according to the third embodiment is described. The operation patterns 1 to 4 may be separately and independently performed, and may be performed by combining at least two operation patterns.

(2) Operation Pattern 1

In the operation pattern 1 of the third embodiment, a case when the D2D radio resource (the shared radio resource) is provided within the uplink radio resource is assumed.

Figure 16:
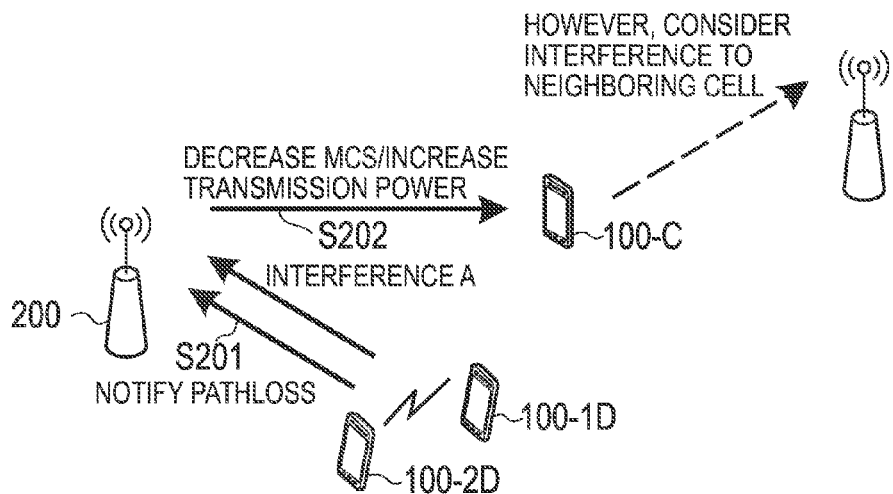
FIG. 16 is a diagram illustrating an operation pattern 1 according to the third embodiment.

FIG. 16 is a diagram illustrating the operation pattern 3. As shown in FIG. 16, when the transmission signal of the D2D UE 100-D is received by the eNB 200, there is a possibility that interference (interference A shown in FIG. 16) occurs between the D2D UE 100-D and the eNB 200. The operation pattern 1 is an operation pattern for suppressing an influence of the interference A.

Firstly, the D2D UE 100-D estimates a D2D communication pathloss that is a pathloss between the D2D UE 100-D and another D2D UE 100-D that is the communication partner of the D2D UE 100-D. The D2D communication pathloss is estimated by calculating a difference between known transmission power and the measured received power. Then, the D2D UE 100-D notifies the eNB 200 of the D2D communication pathloss (step S201). The D2D UE 100-D may notify the D2D communication pathloss to the eNB 200 by a predetermined trigger or at fixed intervals.

Secondary, the eNB 200 compares the notified D2D communication pathloss with the threshold value. The threshold value may be previously held by the eNB 200, and may be notified from a network node included in the EPC 20 to the eNB 200.

Thirdly, the eNB 200 performs the transmission power control corresponding to a result obtained by comparing the D2D communication pathloss with the threshold value. Here, when the D2D communication pathloss is great, the transmission power in the D2D communication becomes high, and therefore, it is regarded that the cellular communication is largely interfered by the D2D communication. Therefore, when the D2D communication pathloss is greater than the threshold value, the eNB 200 performs the transmission power control so as to increase the transmission power of the cellular UE 100-C (step S202). Specifically, power control information for increasing the transmission power is transmitted to the cellular UE 100-C. The power control information may be information for directly designating a value of the transmission power, or information for designating a variation based on current transmission power.

Fourthly, the cellular UE 100-C increases the transmission power according to the power control information. Thus, the eNB 200 receives the transmission signal of the cellular UE 100-C with high power, and therefore, it becomes possible to cancel the influence of the interference A, i.e., improve resistance to the interference A.

The eNB 200 may not only increase the transmission power of the cellular UE 100-C but also perform the MCS control so as to reduce the MCS of the cellular UE 100-C. Specifically, when the D2D communication pathloss is greater than the threshold value, the eNB 200 transmits MCS control information for reducing the MCS to the cellular UE 100-C. The MCS control information is information indicating the changed MCS. In addition, the "reducing the MCS" indicates a change to MCS with a data rate (that is, MCS with high resistance to interference) lower than that of current MCS.

Thus, the cellular UE 100-C continues the cellular communication while increasing a resistance to the interference A. However, when the transmission power of the cellular UE 100-C is increased, interference to a neighboring cell is also increased. Therefore, when it is determined that the cellular UE 100-C is placed at an edge of the cell of the eNB 200, the transmission power of the cellular UE 100-C may not be increased by the eNB 200 even if the D2D communication pathloss is greater than the threshold value.

(3) Operation Pattern 2

In the operation pattern 2 of the third embodiment, a case when the D2D radio resource (the shared radio resource) is provided within the uplink radio resource is assumed.

Figure 17:
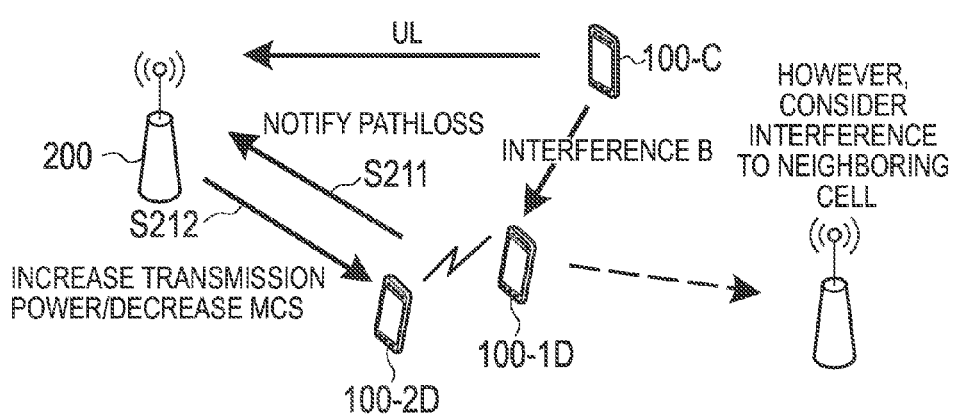
FIG. 17 is a diagram illustrating an operation pattern 2 according to the third embodiment.

FIG. 17 is a diagram illustrating the operation pattern 2. As shown in FIG. 17, when the transmission signal of the cellular UE 100-C (the uplink signal) is received by the D2D UE 100-D, there is a possibility that interference (interference B shown in FIG. 17) occurs between the D2D UE 100-D and the cellular UE 100-C. The operation pattern 2 is an operation pattern for suppressing an influence of the interference B.

Firstly, the D2D UE 100-D notifies the eNB 200 of the D2D communication pathloss (step S211). The operation is the same as that in the operation pattern 1 of the third embodiment.

Secondary, the eNB 200 compares the notified D2D communication pathloss with the threshold value. The operation is the same as that in the operation pattern 1 of the third embodiment.

Thirdly, the eNB 200 performs the transmission power control corresponding to a result obtained by comparing the D2D communication pathloss with the threshold value. Here, when the D2D communication pathloss is small, it is regarded that the transmission power in the D2D communication is sufficiently increased. Therefore, when the D2D communication pathloss is smaller than the threshold value, the eNB 200 performs the transmission power control so as to increase the transmission power of the D2D UE 100-D (step S212). Specifically, the eNB 200 transmits the power control information for increasing the transmission power to the D2D UE 100-D. The power control information may be information for directly designating a value of the transmission power, or information for designating a variation based on current transmission power.

Fourthly, the D2D UE 100-D increases the transmission power according to the power control information. Thus, the D2D UE 100-D receives the transmission signal of another D2D UE 100-D that is the communication partner with high power, and therefore, it becomes possible to cancel the influence of the interference B, i.e., improve resistance to the interference B.

The eNB 200 may not only increase the transmission power of the D2D UE 100-D but also perform the MCS control so as to reduce the MCS of the D2D UE 100-D. Specifically, when the D2D communication pathloss is smaller than the threshold value, the eNB 200 transmits the MCS control information for reducing the MCS to the D2D UE 100-D. The MCS control information is information indicating the changed MCS. In addition, the "reducing the MCS" indicates a change to MCS with a data rate (that is, MCS with high resistance to interference) lower than that of current MCS.

Thus, the D2D UE 100-D continues the D2D communication while increasing a resistance to the interference B. However, when the transmission power of the D2D UE 100-D is increased, interference to a neighboring cell is also increased. Therefore, when it is determined that the D2D UE 100-D is placed at an edge of the cell of the eNB 200, the transmission power of the D2D UE 100-D may not be increased by the eNB 200 even if the D2D communication pathloss is smaller than the threshold value.

(4) Operation Pattern 3

In the operation pattern 3 of the third embodiment, a case where the D2D radio resource (the shared radio resource) is provided within the downlink radio resource is assumed.

Figure 18:
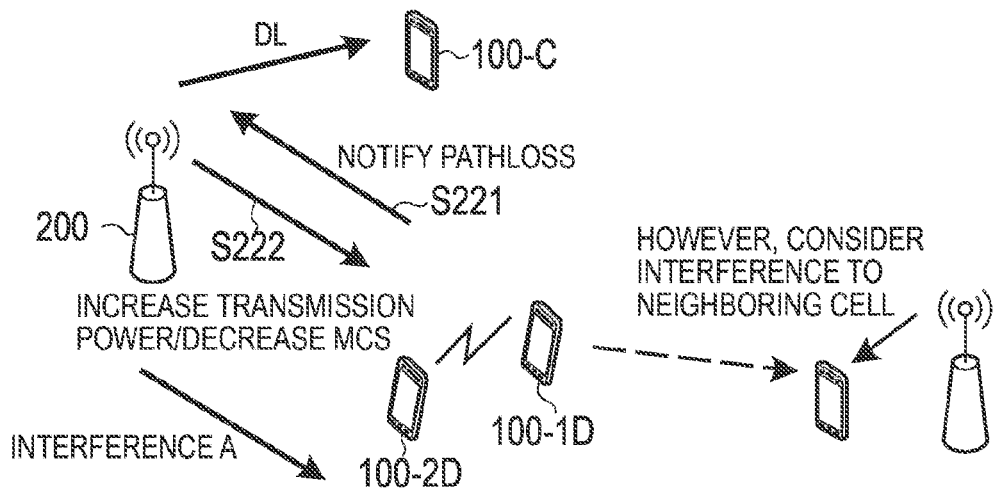
FIG. 18 is a diagram illustrating an operation pattern 3 according to the third embodiment.

FIG. 18 is a diagram illustrating the operation pattern 3. As shown in FIG. 18, when the transmission signal (a downlink signal) of the eNB 200 is received by the D2D UE 100-D, there is a possibility that interference (interference A shown in FIG. 18) occurs between the D2D UE 100-D and the eNB 200. The operation pattern 3 is an operation pattern for suppressing an influence of the interference A.

Firstly, the D2D UE 100-D notifies the eNB 200 of the D2D communication pathloss (step S221). The operation is the same as that in the operation pattern 1 of the third embodiment.

Secondary, the eNB 200 compares the notified D2D communication pathloss with the threshold value. The operation is the same as that in the operation pattern 1 of the third embodiment.

Thirdly, the eNB 200 performs the transmission power control corresponding to a result obtained by comparing the D2D communication pathloss with the threshold value. Here, when the D2D communication pathloss is small, it is regarded that the transmission power in the D2D communication is sufficiently increased. Therefore, when the D2D communication pathloss is smaller than the threshold value, the eNB 200 performs the transmission power control so as to increase the transmission power of the D2D UE 100-D (step S222). Moreover, the eNB 200 may not only increase the transmission power of the D2D UE 100-D but also perform the MCS control so as to reduce the MCS of the D2D UE 100-D. The subsequent operations (operations regarding the transmission power control and the MSC control) are the same as those in the operation pattern 2 of the third embodiment.

(5) Operation Pattern 4

In the operation pattern 4 of the third embodiment, a case when the D2D radio resource (the shared radio resource) is provided within the downlink radio resource is assumed.

Figure 19:
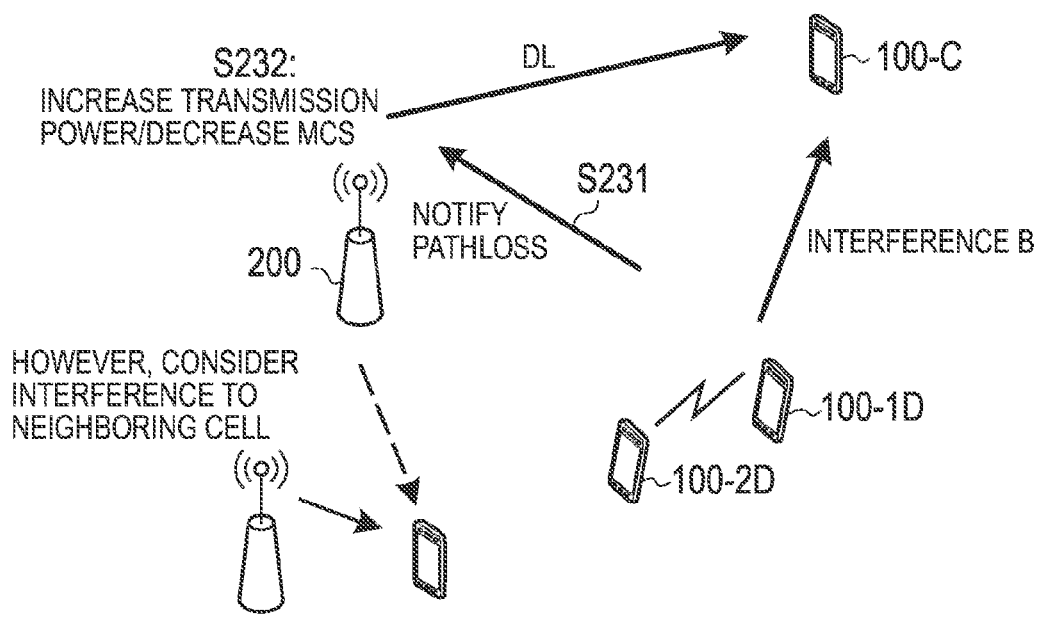
FIG. 19 is a diagram illustrating an operation pattern 4 according to the third embodiment.

FIG. 19 is a diagram illustrating the operation pattern 4. As shown in FIG. 19, when the transmission signal of the D2D UE 100-D is received by the cellular UE 100-C, there is a possibility that interference (interference B shown in FIG. 19) occurs between the D2D UE 100-D and the cellular UE 100-C. The operation pattern 4 is an operation pattern for suppressing an influence of the interference B.

Firstly, the D2D UE 100-D notifies the eNB 200 of the D2D communication pathloss (step S231). The operation is the same as that in the operation pattern 1 of the third embodiment.

Secondary, the eNB 200 compares the notified D2D communication pathloss with the threshold value. The operation is the same as that in the operation pattern 1 of the third embodiment.

Thirdly, the eNB 200 performs the transmission power control corresponding to a result obtained by comparing the D2D communication pathloss with the threshold value. Here, when the D2D communication pathloss is great, the transmission power in the D2D communication becomes high, and therefore, it is regarded that the cellular communication is largely interfered by the D2D communication. Therefore, when the D2D communication pathloss is greater than the threshold value, the eNB 200 performs the transmission power control so as to increase the transmission power of the eNB 200 (step S232). Thus, the cellular UE 100-C receives the transmission signal of the eNB 200 with high power, and therefore, it becomes possible to cancel the influence of the interference B, i.e., improve resistance to the interference B. The eNB 200 may not only increase the transmission power but also perform the MCS control so as to reduce the MCS to be applied to transmission to the cellular UE 100-C.

However, when the transmission power of the eNB 200 is increased, interference to a neighboring cell is also increased. Therefore, when it is determined that the cellular UE 100-C that is a neighboring cell is placed near an edge of the cell of the eNB 200, the transmission power of the eNB 200 may not be increased by the eNB 200 even if the D2D communication pathloss is greater than the threshold value.

Other Embodiments

In the aforementioned first embodiment to third embodiment, the eNB 200 mainly performs a control related to the D2D communication. However, the UE 100 may mainly perform the control related to the D2D communication. For example, a control UE, that controls the D2D communication, may perform the control related to the D2D communication instead of the eNB 200. Therefore, in the aforementioned first embodiment to third embodiment, the eNB 200 may be replaced by the control UE.

The aforementioned first embodiment to third embodiment may be performed separately and independently and may also be performed by combining at least two embodiments.

For example, the assignment determination according to the first embodiment may be performed on the basis of a state of the countermeasures against the interference according to the second embodiment or the third embodiment. That is, when the method of suppressing the interference according to the second embodiment or the third embodiment is incapable, or the interference is not improved even by the method of suppressing the interference, the dedicated resource assignment mode may be determined to be applied.

Figure 20:
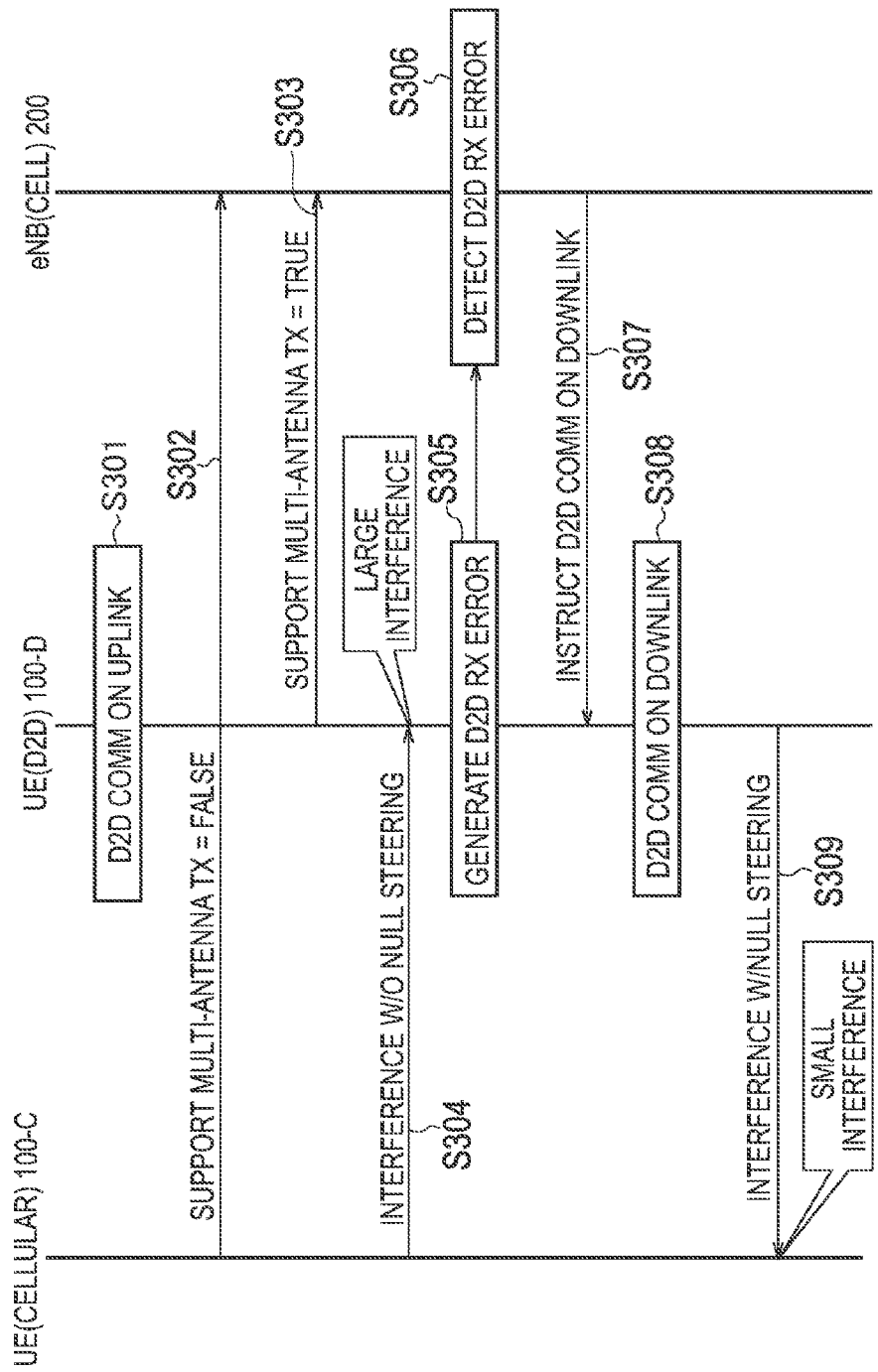
FIG. 20 is an operation sequence diagram in a state where the availability of a support for a multi-antenna transmission is considered.

In the aforementioned second embodiment, the UE 100 is required to support the multi-antenna transmission in order to suppress the interference. Therefore, it is desired that the UE 100 considers whether a support for the multi-antenna transmission is available. FIG. 20 is an operation sequence diagram in a state where whether the availability of a support for the multi-antenna transmission is considered. In FIG. 20, the D2D UE 100-D performs the D2D communication by using the D2D radio resource (the shared radio resource) provided within the uplink radio resource (step S301). Each of the cellular UE 100-C and the D2D UE 100-D notifies the eNB 200 of the availability of a support for the multi-antenna transmission of the cellular UE 100-C and the D2D UE 100-D (steps S302 and S303). Here, a description will be provided on the assumption that the cellular UE 100-C does not support the multi-antenna transmission (i.e., it is impossible to perform the null steering). The D2D UE 100-D is largely interfered by the cellular UE 100-C (step S304), and the D2D UE 100-D detects the interference (step S305) so as to notify the eNB 200 of the detection (step S306). The eNB 200 commands the D2D UE 100-D to perform the D2D communication by using the downlink radio resource (step S307). The D2D UE 100-D performs the D2D communication by using the D2D radio resource (the shared radio resource) provided within the uplink radio resource (step S308). The D2D UE 100-D supports the multi-antenna transmission (i.e., it is possible to perform the null steering), and therefore, it becomes possible to reduce the interference to the cellular UE 100-C (step S309). It is noted that, the D2D radio resource is not only changed between the uplink radio resource and the downlink radio resource, but also may be changed by each component carrier.

Figure 21:
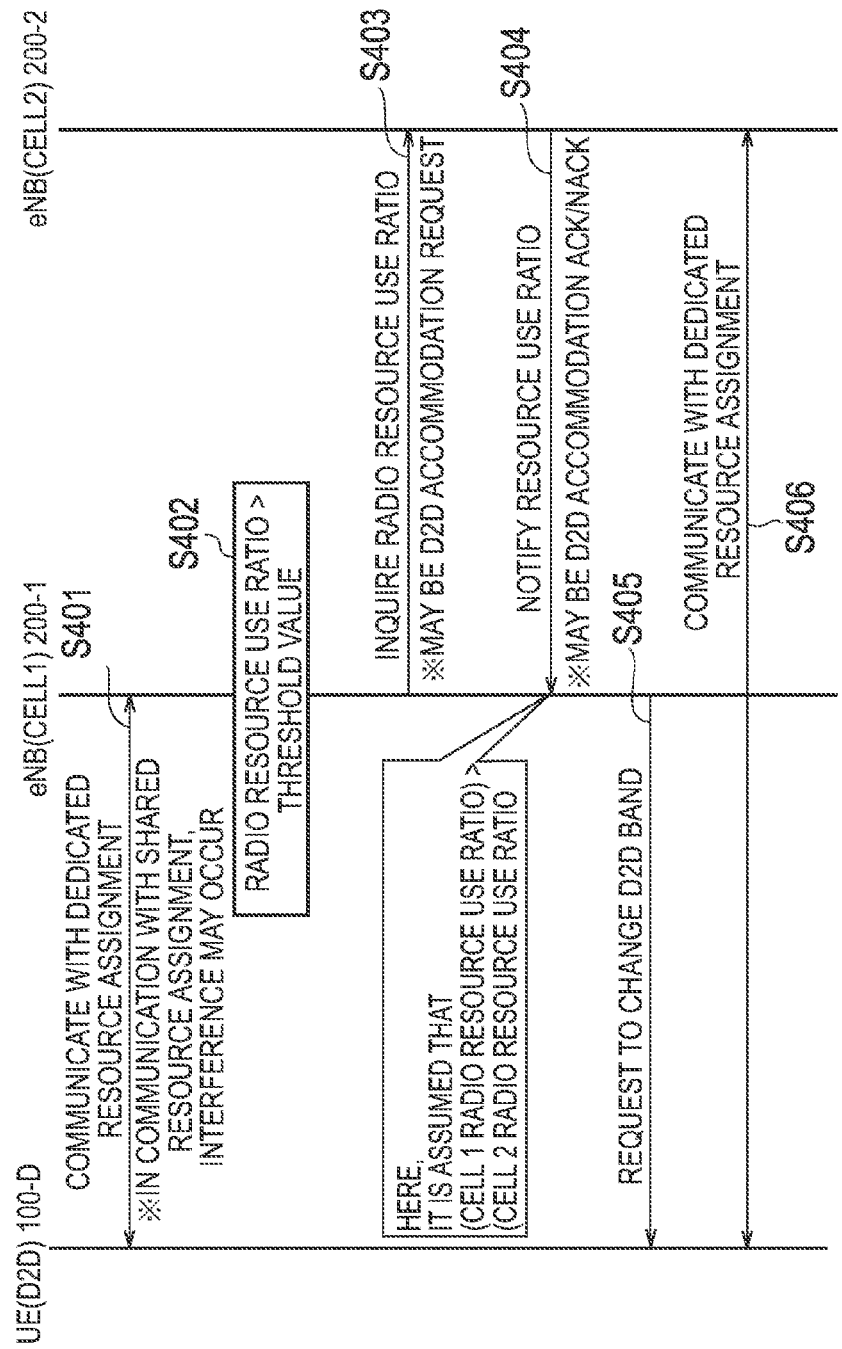
FIG. 21 is an operation sequence diagram in a state where switching to a neighboring cell is considered.

In the aforementioned first embodiment, an example in which the shared resource assignment mode is applied to the D2D UE 100-D when the amount of radio resource to be used within the cell exceeds the threshold value has been described. However, if the amount of radio resource to be used in the neighboring cell is small, the dedicated resource assignment mode may be applied to the D2D UE 100-D after switching the D2D UE 100-D to the neighboring cell. FIG. 21 is an operation sequence diagram in a state when switching to the neighboring cell is considered. When the dedicated resource assignment mode is applied to the D2D UE 100-D (step S401) and when the amount of radio resource to be used in the cell exceeds the threshold value (step S402), the eNB 200 inquires and acquires the amount of radio resource to be used in the neighboring cell to another eNB 200 that manages the neighboring cell (steps S403 and S404). Otherwise, when the shared resource assignment mode is applied to the D2D UE 100-D and the interference being occurred between the D2D communication and the cellular communication is detected, the eNB 200 may inquire and acquire the amount of radio resource to be used in the neighboring cell. The eNB 200 determines to switch the cell when the D2D communication is performed to the neighboring cell when the amount of radio resource to be used in the neighboring cell is smaller than the amount of radio resource to be used in the cell of the eNB 200. Otherwise, instead of inquiring the amount of radio resource to be used in the neighboring cell, a request of accommodating the D2D communication may be transmitted to the neighboring cell so as to perform the determination in the neighboring cell. Here, a description will be provided on the assumption that it is determined that the cell where the D2D communication is performed is switched to the neighboring cell. The eNB 200 requests the D2D UE 100-D to switch to the frequency band of the neighboring cell (step S405). Then, the D2D UE 100-D starts the D2D communication in the frequency band of the neighboring cell (step S406).

The aforementioned third embodiment has been described while focusing on the operation of increasing the transmission power on the basis of the threshold determination result of the D2D communication pathloss. However, an operation of reducing the transmission power (and the MCS) on the basis of the threshold determination result of the D2D communication pathloss may be applied.

In each of the aforementioned embodiments, an example in which all of the D2D UEs 100-D included in one D2D UE group establish the communication with the eNB 200 has been described. However, only one D2D UE 100-D (a so-called anchor UE) included in one D2D UE group may establish the communication with the eNB 200. The anchor UE exchanges the control signal with the eNB 200 as the representative of the D2D UE group. In this case, the eNB 200 does not necessarily exchange the control signals with all of the D2D UEs 100-D included in the D2D UE group, and may exchange the control signals with only the anchor UE.

Each of the aforementioned embodiments has described an example in which the present invention is applied to the LIE system. However, the present invention may also be applied to systems other than the LTE system, as well as the LIE system.

[Additional Statement]

Hereinafter, additional statements for the aforementioned embodiments will be described.

In the LTE-Advanced for which the 3rd Generation Partnership Project (3GPP) is developing a specification, Proximity Service (ProSe), which enables discovery of a proximity terminal and communication between proximity terminals, has been studied. The motivations for introducing the ProSe include: 1) to provide new services; 2) to improve frequency efficiency and to reduce core network load; 3) to reduce terminal transmission power; and 4) to establish emergency safety network. The result of items to be studied on schemes and issues relating to ProSe deployment will be described while focusing on the improvement of frequency efficiency by direct device-to-device communication.

1. Introduction

A technical specification of the LTE-Advanced, a sophisticated system of Long Term Evolution (LTE), is standardized as Release 10 and 11 in the 3rd Generation Partnership Project (3GPP). A large number of international and domestic mobile communication carriers start the operation or express the adoption of the LTE-Advanced. Currently, there are continued discussions about Release 12 with an aim toward a more sophisticated version. As one of the items to be studied on the Release 12, a specification of a technology of the Proximity Service (ProSe) has been studied in which a proximity user terminal is discovered on an LTE-Advanced network and direct device-to-device communication is performed without passing through a core network. The motivations for introducing the ProSe may include the following:

To create new added values and user experience

To support new applications, for example, application to social network services connecting adjacent users and delivery of advertising to customers coming in the proximity;

To effectively utilize radio frequency and reduce the core network load

To achieve to effectively utilize frequency through communication between spatially separated pairs of terminals with a repeated use of the same resource, and to reduce the core network load through communication without passing through the core network;

Reduction of Terminal Transmission Power

To reduce terminal transmission power by directly transmitting to a proximity terminal instead of a distant base station, and as a by-product, to reduce interference power to a neighboring cell; and Public Safety Use To utilize ProSe as a safety network in an emergency such as a large-scale disaster. To take advantage of direct device-to-device communication as a communication means when networks fail.

Furthermore, the ProSe is assumed to be provided by using a licensed band for the LTE, and thus the followings are required.

Comprehension and control of device-to-device communication by communication carriers For the purposes of operation, maintenance, and charging, for example, by a communication carrier possessing a licensed band, the device-to-device communication is required to be performed under the management of the communication carrier.

Control of switching a data path by a network

When the ProSe is available, as to a data session, a path using conventional cellular communication and a path using the ProSe are required to be freely switched from the network side.

However, with respect to the Public Safety use, an operation also on a dedicated band is assumed and the communication must be operated outside the network coverage. Therefore, in this case, the above may not apply.

Below, this additional statement focuses, among various functions of the ProSe, in particular, on the direct device-to-device communication, from the viewpoint of the improvement of the radio frequency efficiency, and then, studies the issues.

2. Device-to-Device Communication in ProSe

In the 3GPP, a plurality of schemes are proposed for the device-to-device communication scheme in the ProSe. Hereinafter, each of the schemes will be explained.

2.1. Locally Routed Scheme

As shown in FIG. 7, the Locally Routed scheme is as follows: in communicating between terminals, the base station interposes therebetween; however, user data does not pass through a core network and a path is completed only between each of the terminals and the base station. In this scheme, communication between each of the terminals and the base station is necessary, and thus, while the radio frequency efficiency is as good as that of the normal cellular communication, it is possible to reduce a load to the core network.

2.2. Direct Scheme

Figure 22:
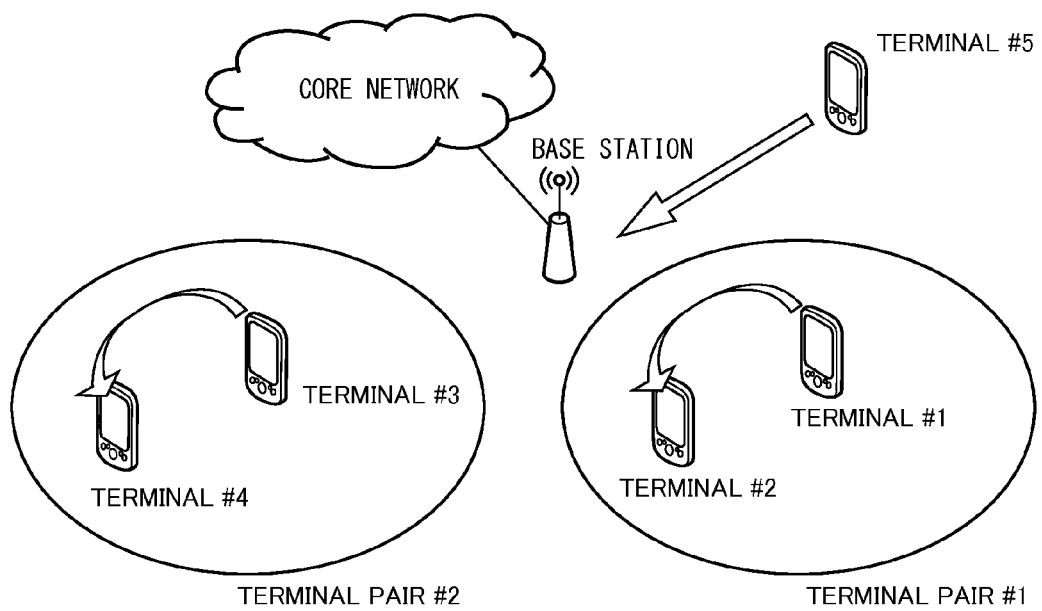
FIG. 22 is a diagram illustrating a scheme (Direct scheme) in which communication is performed by directly connecting between terminals with a radio link.

On the other hand, as shown in FIG. 22, there is also assumed a scheme (Direct scheme) in which communication is performed by directly connecting between terminals with a radio link. In this case, it is possible to improve the frequency efficiency while enabling reduction of the load to the core network in much the same way as the aforementioned Locally Routed scheme.

This is a result from a mechanism in which: when performing communication between a terminal #1 and a terminal #2, it is possible to communicate by using only one link between the terminal #1 and the terminal #2 while the conventional cellular communication needs two links between the terminal #1 and the base station and between the base station and the terminal #2; and it is possible to effectively utilize a space resource by sharing the same radio resource between spatially separated pairs of terminals (a pair of terminals #1 and a pair of terminals #2) and furthermore with the cellular communication (a terminal #5 and the base station).

However, it should be noted that unlike the Locally Routed scheme in which a base station directly interposes in communication, there is a need of control such as that the base station designates a resource to be used between terminals for the purposes of comprehension and control of device-to-device communication by communication carriers.

Hereinafter, from the viewpoint of effectively utilizing radio frequency, the latter Direct scheme will be discussed.

3. Used Frequency Band

Next, a frequency band to be used for the ProSe will be described. As available methods of selecting the frequency band to be used for the ProSe, there are considered the methods of: preparing a dedicated band for the ProSe; applying a part of a frequency resource for the cellular to the ProSe; or sharing the frequency resource for the cellular with the ProSe. Hereinafter, each of these will be described.

3.1. Operation on ProSe Dedicated Band

As shown in FIG. 23, a method of preparing a band being used exclusively for ProSe is operationally the easiest method. In this case, it is not necessary to take into account interference between the ProSe and the cellular communication, so that it is not necessary to dynamically control for resource assignment in which the interference is taken into account. However, this method is not preferable from the viewpoint of the frequency efficiency, and there is a problem in which communication carriers should prepare a new band for the ProSe.

3.2. Operation in ProSe Dedicated Region on Cellular Communication Band

FIG. 24 illustrates the method of preparing a region for ProSe by time-dividing, frequency-dividing, or both of them on the cellular communication band. This method does not require an operator to prepare a new band for the ProSe, and interference between the ProSe and the cellular communication is not caused especially only in a cell. Furthermore, a configuration may be possible where depending on a traffic condition of the ProSe and the cellular communication, the region for the ProSe is variable. On the other hand, there is a problem that a resource for the cellular communication is reduced, when the region for the ProSe is increased in area.

3.3. Operation in ProSe Shared Region on Cellular Communication Band

FIG. 25 illustrates, with respect to a resource on the cellular communication band, the method of sharing the resource by spatially multiplexing a resource for the ProSe. In this case, it is possible to secure the resource for the ProSe without reducing the resource for the cellular communication, so that this method is preferable from the viewpoint of the frequency efficiency. However, cellular-ProSe interference occurs, and then a mechanism for appropriately detecting and controlling the interference is necessary. Hereinafter, detailed cellular-ProSe interference will be described.

3.3.1. ProSe Operation on Downlink Band of Cellular Communication

FIG. 26 illustrates a diagram in the case of arranging a ProSe band on a downlink band of the cellular communication. In this case, interference that should be taken into account is as follows.

1) Interference to a reception in the ProSe by a base station downlink transmission in the cellular communication;

2) Interference to a terminal downlink reception in the cellular communication by a transmission in the ProSe.

As for 1), the influence is significant when a ProSe terminal exists in the proximity of the base station. It is possible to detect interference by detecting the downlink reception in the cellular communication by the ProSe terminal. The detection of the interference enables interference control by methods such as:

scheduling of the cellular communication and the ProSe;

transmission power control of the cellular communication and the ProSe; and beamforming of the cellular communication.

On the other hand, as for 2), the degree of influence varies according to a distance between a ProSe terminal and a cellular terminal. That is, this means that the influence of interference may change depending on a cellular terminal for which a downlink transmission is scheduled on the same resource as the ProSe. This interference should be detected by the cellular terminal, however, it might be difficult that an existing terminal detects the interference. Furthermore, interference occurs only at the timing of a transmission of the ProSe terminal, which is one of the causes for the difficulty in detecting the interference. If it is possible to detect this interference, interference control is enabled by methods such as:

scheduling of the cellular communication and the ProSe;

transmission power control of the cellular communication and the ProSe; and beamforming of the ProSe.

3.3.2. ProSe Operation on Uplink Band of Cellular Communication

Figure 27:
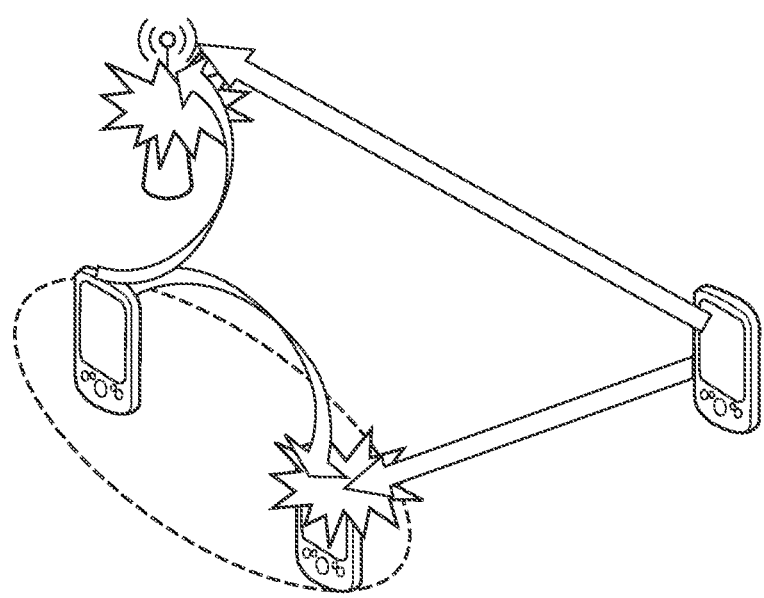
FIG. 27 is a diagram illustrating a case of arranging the ProSe band on an uplink band of the cellular communication.

FIG. 27 illustrates a diagram in the case of arranging the ProSe band on an uplink band of the cellular communication. In this case, interference that should be taken into account is as follows.

1) Interference to a reception in the ProSe by a terminal uplink transmission in the cellular communication;

2) Interference to a base station uplink reception in the cellular communication by transmission in the ProSe.

As for 1), the influence is significant when a ProSe terminal exists at an area edge of the base station. That is, large interference occurs when a cellular terminal at the area edge with high transmission power exists in the proximity of the ProSe terminal, and this cellular terminal and the ProSe terminal are scheduled on the same resource. It is possible to detect interference by detecting the uplink transmission in the cellular communication by the ProSe terminal. The detection of the interference enables interference control by methods such as:

scheduling of the cellular communication and the ProSe;

transmission power control of the cellular communication and the ProSe; and beamforming of the cellular communication.

On the other hand, as for 2), the influence is significant when a ProSe terminal exists in the proximity of the base station, however, the detection of interference might be relatively easy to be performed because the base station is subject to the interference. The available methods for controlling interference are:
- scheduling of the cellular communication and the ProSe;
- transmission power control of the ProSe; and
- beamforming of the ProSe.

As described above, from the viewpoint of ease of achieving interference detection, it might be preferable that an uplink band is used for operation in a ProSe shared region on the cellular communication band. Hereinafter, interference control in the case of using an uplink band of the cellular communication for the ProSe will be described in more details.

4. Interference Control

Hereinafter, interference control in the case of using an uplink band of the cellular communication for the ProSe will be described.

4.1. Interference Detection

When controlling interference, firstly it is important that occurrence of the interference is to be detected. The interference that should be detected and the detection method thereof will be described below.

4.1.1. Interference to Reception in ProSe by Terminal Uplink Transmission in Cellular Communication A cellular terminal on which an uplink transmission, i.e., an interference source, is scheduled differs for each subframe, so that it may be desired that a ProSe terminal for performing interference detection preferably performs the interference detection according to the instruction from the base station when necessary. That is, when a terminal uplink transmission of the cellular communication is scheduled in the ProSe region, a signal series of a Demodulation Reference Signal (DMRS) used by this cellular terminal is notified to the ProSe terminal to thereby detect the interference and perform channel estimation on an interference path. The ProSe terminal becomes capable of performing appropriate interference control by applying feedback on the detected interference power and the channel information to the base station. In addition, as a signal to be used for the interference detection, not only the DMRS of a terminal on which a data channel is scheduled, but also a Sounding Reference Signal (SRS) of a terminal on which the SRS is scheduled can be used.

4.1.2. Interference to Base Station Uplink Reception in Cellular Communication by Transmission in ProSe It is easy to specify a ProSe terminal that should be detected when a base station, which is the detector of interference, comprehends scheduling of ProSe communication. Interference detection from individual ProSe terminals becomes possible by assigning a separate DMRS or a signal for measuring a channel response such as the SRS, for each ProSe terminal and transmitting the assigned signal. The aforementioned interference detection enables the estimation of:
1) interfered and interfering terminals;
2) interference power;
3) a channel response from an interference source, a covariance matrix thereof, a transmission precoder that reduces interference; or the like.

By using these interference detection results, it becomes possible to perform interference control by means such as scheduling, transmission power control, and beamforming. Hereinafter, these interference control methods will be described.

4.2. Interference Control by Scheduling

Interference control by scheduling will be described below.

4.2.1. Interference to Reception in ProSe by Terminal Uplink Transmission in Cellular Communication When a cellular communication terminal (terminal B) is specified, which gives large interference to a certain ProSe terminal (terminal A),
- it is possible to suppress the influence of interference on the ProSe communication, by: not scheduling the ProSe communication of the terminal A and an uplink transmission of the terminal B on the same resource; and
- switching a modulation scheme used by the terminal A into a scheme with high resistance to interference when the terminal A and the terminal B are scheduled on the same resource.

4.2.2. Interference to Base Station Uplink Reception in Cellular Communication by Transmission in ProSe When a ProSe terminal (terminal C) is specified, which gives large interference to the base station uplink reception,
- it is possible to suppress the influence of interference on the cellular communication, by: not scheduling a terminal uplink transmission in the cellular communication on a resource on which the terminal C performs communication, or not scheduling the communication of the terminal C on a resource on which scheduling of the terminal uplink transmission in the cellular communication is applied; and
- switching a modulation scheme used by a cellular communication terminal into a scheme with high resistance to interference when the terminal C and the cellular communication terminal are scheduled on the same resource.

4.3. Interference Control by Transmission Power Control

Interference control by transmission power control will be described below.

4.3.1. Interference to Reception in ProSe by Terminal Uplink Transmission in Cellular Communication When a cellular communication terminal (terminal E) is specified, which gives large interference to a certain ProSe terminal (terminal D),
- it is possible to suppress the influence of interference on the ProSe communication, by: increasing transmission power of the terminal D or decreasing transmission power of the terminal E when the terminal D and the terminal E are scheduled on the same resource.

4.3.2. Interference to Base Station Uplink Reception in Cellular Communication by Transmission in ProSe When a ProSe terminal (terminal F) is specified, which gives large interference to the base station uplink reception,
- it is possible to suppress the influence of interference on the cellular communication, by: decreasing transmission power of the terminal F or increasing transmission power of the cellular terminal when the terminal F and the cellular terminal are scheduled on the same resource.

However, transmission power control for reducing interference as described above can be controlled in the reverse direction depending on interfered and interfering directions focused, and thus, it is necessary to perform control in comprehensive consideration of various factors such as the level of seriousness of interference received by each of the ProSe communication or the cellular communication, the level of communication quality to be required, and the like, and otherwise, it would be difficult to perform appropriate control.

4.4. Interference Control by Beamforming

Interference suppression by beamforming has been discussed about multiuser MIMO, coordinated beamforming multi-cell coordination, and the like also in the LTE-Advanced. Interference control by beamforming will be described below.

4.4.1. Interference to Reception in ProSe by Terminal Uplink Transmission in Cellular Communication When a cellular communication terminal (terminal H) is specified, which gives large interference to a certain ProSe terminal (terminal G), it is possible to suppress interference on the ProSe communication, by: controlling a transmission precoder of the terminal H so as to reduce interference to the terminal G by the transmission of the terminal H when the terminal G and the terminal H are scheduled on the same resource.

4.4.2. Interference to Base Station Uplink Reception in Cellular Communication by Transmission in ProSe When a ProSe terminal (terminal I) is specified, which gives large interference to the base station uplink reception, it is possible to suppress interference on the cellular communication, by: controlling a transmission precoder of the terminal I so as to reduce interference to the base station by the transmission of the terminal I when the terminal I and the cellular communication terminal are scheduled on the same resource.

5. Conclusion

With respect to the direct device-to-device communication in the LTE-Advanced, from the viewpoint of improving the radio frequency efficiency, this report has described:

Schemes for achievement;
Used Frequency Band; and
Interference Control.

As described above, the scheme in which the direct device-to-device communication without passing through a base station is used for the ProSe and a resource is shared between the cellular communication and the ProSe communication is preferable from the viewpoint of the radio frequency efficiency, however, it is necessary to appropriately control mutual interference. Furthermore, the mechanism necessary for the interference detection and the interference control has been described, so that it becomes clear that the uplink band of the cellular is preferably shared with the ProSe from the viewpoint of the ease of the interference detection, and examples of the available methods for controlling the interference in the above case include scheduling, transmission power control, and beamforming. In addition, interference between ProSe communications has not been discussed. However, this interference can be treated in the same way as interference between cellular communication and ProSe communication.

Cross Reference

The entire contents of U.S. Provisional Application No. 61/763,587 (filed on Feb. 12, 2013) are incorporated herein by reference.

INDUSTRIAL APPLICABILITY

The present invention is useful for radio communication fields.

The invention claimed is:

1. A mobile communication system that supports cellular communication in which a data path passes through a core network and D2D communication that is direct device-to-device communication in which the data path does not pass through the core network, the system comprising a communication apparatus configured to assign a radio resource to a D2D terminal that performs the D2D communication, wherein the communication apparatus performs assignment determination as to whether a dedicated radio resource not shared with the cellular communication is assigned to the D2D terminal or a shared radio resource shared with the cellular communication is assigned to the D2D terminal.

2. The mobile communication system according to claim 1, wherein the communication apparatus performs the assignment determination on the basis of an amount of radio resource to be used in a cell in which the D2D terminal exists.

3. The mobile communication system according to claim 1, wherein the communication apparatus performs the assignment determination on the basis of a communication quality of the D2D communication.

4. The mobile communication system according to claim 3, wherein the communication quality includes a status of an interference suffered by the D2D terminal, the communication apparatus instructs the D2D terminal to perform an interference detection, and the D2D terminal reports an interference detection result to the communication apparatus on the basis of an instruction of the interference detection.

5. The mobile communication system according to claim 1, wherein the communication apparatus performs the assignment determination on the basis of information on a pathloss between the D2D terminal and other device, and the other device is any of: a cellular terminal that performs the cellular communication, a base station that assigns the radio resource to the D2D terminal, another D2D terminal that is not a communication partner of the D2D terminal, and other D2D terminal that is a communication partner of the D2D terminal.

6. The mobile communication system according to claim 5, wherein one of the D2D terminal, the cellular terminal, and the other D2D terminal reports the information on the pathloss to the communication apparatus, and the communication apparatus receives the information on the pathloss, and performs the assignment determination on the basis of the received information.

7. A communication apparatus that assigns a radio resource to a D2D terminal that performs D2D communication in a mobile communication system that supports cellular communication in which a data path passes through a core network and the D2D communication that is direct device-to-device communication in which the data path does not pass through the core network, comprising a controller configured to perform assignment determination as to whether a dedicated radio resource not shared with the cellular communication is assigned to the D2D terminal or a shared radio resource shared with the cellular communication is assigned to the D2D terminal.

* * * * *